US012790511B2

(12) United States Patent
Uzawa et al.

(10) Patent No.: US 12,790,511 B2
(45) Date of Patent: Nov. 10, 2026

(54) AQUEOUS COATING MATERIAL COMPOSITION, METHOD FOR FORMING COATING FILM, AND METHOD FOR FORMING MULTILAYER COATING FILM

(71) Applicant: KANSAI PAINT CO., LTD., Hyogo (JP)

(72) Inventors: Yuji Uzawa, Kanagawa (JP); Kazuya Watanabe, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 18/997,495

(22) PCT Filed: Apr. 14, 2023

(86) PCT No.: PCT/JP2023/015151
§ 371 (c)(1),
(2) Date: Jan. 21, 2025

(87) PCT Pub. No.: WO2024/018708
PCT Pub. Date: Jan. 25, 2024

(65) Prior Publication Data

US 2026/0035593 A1 Feb. 5, 2026

(30) Foreign Application Priority Data

Jul. 22, 2022 (JP) ................................ 2022-116797

(51) Int. Cl.
*C09D 7/65* (2018.01)
*C08G 18/12* (2006.01)
*C08G 18/32* (2006.01)
*C09D 175/14* (2006.01)
*C25D 5/48* (2006.01)

(52) U.S. Cl.
CPC .......... *C09D 175/14* (2013.01); *C08G 18/12* (2013.01); *C08G 18/3228* (2013.01); *C08G 18/3234* (2013.01); *C09D 7/65* (2018.01); *C25D 5/48* (2013.01)

(58) Field of Classification Search
CPC .. C08F 120/18; C08F 265/06; C08G 18/0866; C08G 18/672; C08G 18/3212; C08G 18/4018; C08G 18/6625; C08G 18/722; C08G 18/227; C08G 18/348; C08G 18/44; C08G 18/4854; C08G 18/755; C08G 18/758; C09D 175/08; C09D 151/003; C09D 5/02; C08K 5/5419; B05D 7/572
See application file for complete search history.

(56) References Cited

U.S. PATENT DOCUMENTS

2012/0021228 A1* 1/2012 Kitagawa ............... B05D 7/572 428/423.1
2016/0002388 A1* 1/2016 Hase ......................... C08F 2/50 525/454
2018/0230327 A1* 8/2018 Kanda ...................... C09D 5/02
2022/0162473 A1 5/2022 Hiramatsu et al.
2024/0026144 A1* 1/2024 Watanabe ......... C08F 220/1804

FOREIGN PATENT DOCUMENTS

JP 2011219679 A * 11/2011
JP 2014-162892 A 9/2014
JP 2015-174958 A 10/2015
WO WO-2010/082607 A1 7/2010
WO WO-2017/038306 A1 3/2017
WO WO-2017090489 A1 * 6/2017 .............. C09D 7/40

OTHER PUBLICATIONS

JP-2011219679-A English translation (Year: 2011).*
WO-2017090489-A1 English translation (Year: 2017).*
International Search Report, corresponding International Application No. PCT/JP2023/015151, mailing date Jun. 20, 2023.

* cited by examiner

*Primary Examiner* — Hai Y Zhang
(74) *Attorney, Agent, or Firm* — MARSHALL, GERSTEIN & BORUN LLP

(57) ABSTRACT

The purpose of the present invention is to provide an aqueous coating material composition which exhibits excellent storage stability and can form a coating film having excellent abrasion resistance, chipping resistance and adhesion to glass even if cured at a relatively low temperature. This aqueous coating material composition contains: an aqueous dispersion of particles of a urethane resin (A) obtained from a compound (a1) having a secondary amino group and an alkoxysilyl group and an isocyanate group-containing urethane prepolymer (a2); and a curing agent (B). The aqueous coating material composition is characterized in that: the compound (a1) having a secondary amino group and an alkoxysilyl group is obtained from constituent components including a compound (a11) containing a primary amino group and an alkoxysilyl group and a polymerizable unsaturated group-containing compound (a12); and the content of the curing agent (B) falls within the range 5-50 mass % relative to the total amount of solid resin content in the aqueous coating material composition.

11 Claims, No Drawings

AQUEOUS COATING MATERIAL COMPOSITION, METHOD FOR FORMING COATING FILM, AND METHOD FOR FORMING MULTILAYER COATING FILM

FIELD

The present invention relates to an aqueous coating composition, a coating film forming method, and a multilayer coating film forming method.

BACKGROUND

In automobile coating, a method of forming a multilayer coating film by a three-coat two-bake (3C2B) system in which an electrodeposition coating material is applied to an object to be coated, followed by application of an intermediate coating material→baking and curing→application of an aqueous base coating material→preheating→application of a clear coating material→baking and curing, is widely employed. In recent years, from the perspective of energy conservation, a three-coat one-bake (3C1B) system is becoming popular, in which the baking and curing process after application of an intermediate coating material is omitted, and an electrodeposition coating material is applied to an object to be coated, followed by application of an aqueous intermediate coating material→preheating as needed→application of an aqueous base coating material→preheating→application of a clear coating material→baking and curing.

Recently, it has been required to lower the heating temperature in the baking and curing process to further reduce energy to be used.

However, if the heating temperature is low, there may be cases in which chipping resistance property against the chipping phenomenon where the coating film peels off when a pebble hits the coating surface of an automobile body exterior panel, and glass adhesion property which is resistance to loads applied to the adhesive joint between the glass and the coating film, are insufficient.

Furthermore, for coating parts of automobile bodies where the requirements for appearance are not high, further reduction in coating man-hours is being considered. For example, a one-coat one-bake (1C1B) system is being considered, in which an electrodeposition coating material is applied to an object to be coated, followed by application of an aqueous base coating material→preheating→baking and curing. In this case, since the uppermost coating film is to be a base coating film formed by an aqueous base coating material, the base coating film is required to have high coating film performance such as abrasion resistance property, etc.

However, coating compositions that have high coating film performance even when heated at a relatively low temperature generally have high reactivity and may have insufficient storage stability.

Patent Literature 1 teaches an aqueous coating composition characterized by comprising: (A) an aqueous resin; (B) a melamine resin; and (C) a weak acid catalyst; wherein the (A) aqueous resin has a hydroxyl value of 80 to 200 mg KOH/g, calculated as resin solid; the (B) melamine resin has an average imino group amount of 1.0 or more and an average methylol group amount of 0.5 or more per melamine nucleus; the (A) aqueous resin and the (B) melamine resin have a mass ratio of 90/10 to 60/40, calculated as solid; and the (C) weak acid catalyst is contained in an amount of 0.1 to 10.0 parts by mass, based on 100 parts by mass of the combined total of the (A) aqueous resin and the (B) melamine resin, has excellent low-temperature curing property and storage stability compared to conventional coatings.

CITATION LIST

Patent Literature

[PTL 1]
Japanese Unexamined Patent Publication No. 2015-174958

SUMMARY

Technical Problem

In the technique described in Patent Literature 1, although the obtained aqueous coating composition has excellent low-temperature curing property and storage stability, there may be cases where the abrasion resistance property, chipping resistance property and glass adhesion property of the coating film to be formed are insufficient.

The object of the present invention is to provide an aqueous coating composition which is capable of forming a coating film excellent in the storage stability, as well as the abrasion resistance property, chipping resistance property and glass adhesion property, even when cured at a relatively low temperature.

Solution to Problem

As a result of intensive research so as to achieve the above object, the present inventors has found that an aqueous coating composition comprising: a urethane resin (A) particle aqueous dispersion which is obtained from a component containing a secondary amino group- and alkoxysilyl group-containing compound (a1), and an isocyanate group-containing urethane prepolymer (a2); and a curing agent (B), wherein the secondary amino group- and alkoxysilyl group-containing compound (a1) is obtained from a component containing a primary amino group- and alkoxysilyl group-containing compound (a11) and a polymerizable unsaturated group-containing compound (a12), and the isocyanate group-containing urethane prepolymer (a2) is obtained from a component containing a polyisocyanate component (a21) and a polyol component (a22), and a content of the curing agent (B) is in a range of 5 to 50 mass % based on a total resin solid amount in the aqueous coating composition achieves the above object.

That is, the present invention relates to the following Aspects <1> to <11>.

Aspect <1> An aqueous coating composition comprising:

a urethane resin (A) particle aqueous dispersion which is obtained from a component containing a secondary amino group- and alkoxysilyl group-containing compound (a1), and an isocyanate group-containing urethane prepolymer (a2); and a curing agent (B), wherein the secondary amino group- and alkoxysilyl group-containing compound (a1) is obtained from a component containing a primary amino group- and alkoxysilyl group-containing compound (a11) and a polymerizable unsaturated group-containing compound (a12), and the isocyanate group-containing urethane prepolymer (a2) is obtained from a component containing a polyisocyanate component (a21) and a polyol component (a22), and a content of the curing agent (B) is within a range of 5 to 50 mass % based on a total resin solid amount in the aqueous coating composition.

Aspect <2> The aqueous coating composition according to Aspect <1>, wherein the polymerizable unsaturated group-containing compound (a12) includes a (meth)acrylate.

Aspect <3> The aqueous coating composition according to Aspect <1> or <2>, wherein the polyisocyanate component (a21) includes an alicyclic polyisocyanate compound (a21-1).

Aspect <4> The aqueous coating composition according to any one of Aspects <1> to <3>, wherein the polyol component (a22) includes at least one type of polyol selected from a polycarbonate polyol (a22-1) and a polyether polyol (a22-2).

Aspect <5> The aqueous coating composition according to any one of Aspects <1> to <4>, wherein the urethane resin (A) particle aqueous dispersion contains a chain extender (a3) as a component.

Aspect <6> The aqueous coating composition according to any one of Aspects <1> to <5>, wherein the aqueous coating composition contains the urethane resin (A) particle aqueous dispersion by within a range of 10 to 70 mass % based on a total resin solid amount in the aqueous coating composition.

Aspect <7> The aqueous coating composition according to any one of Aspects <1> to <6>, wherein the curing agent (B) includes a polycarbodiimide compound (B1).

Aspect <8> The aqueous coating composition according to any one of Aspects <1> to <7>, further comprising at least one type of a resin selected from an acrylic resin (C) and a polyester resin (D).

Aspect <9> A coating film forming method comprising steps of:

a step (I-1) of forming an uncured color coating film by applying the aqueous coating composition according to any one of Aspects <1> to <8> on an object to be coated; and a step (I-2) of thermal curing the uncured color coating film which has been formed in the step (I-1).

Aspect <10> A multilayer coating film forming method comprising steps of:

a step (II-1) of forming an uncured intermediate coating film by applying an intermediate coating composition on an object to be coated;

a step (II-2) of forming an uncured basecoat coating film by applying a basecoat coating composition on the uncured intermediate coating film which has been formed in the step (II-1);

a step (II-3) of forming an uncured clear-coat coating film by applying a clear-coat coating composition on the uncured basecoat coating film which has been formed in the step (II-2); and a step (II-4) of thermal curing the uncured intermediate coating film which has been formed in the step (II-1), the uncured basecoat coating film which has been formed in the step (II-2), and the uncured clear-coat coating film which has been formed in the step (II-3), at once, wherein at least one of the intermediate coating composition and the basecoat coating composition is the aqueous coating composition according to any one of Aspects <1> to <8>.

Aspect <11> The multilayer coating film forming method according to claim 10, wherein both of the intermediate coating composition and the basecoat coating composition are the aqueous coating composition according to any one of Aspects <1> to <8>.

Advantageous Effects of Invention

According to the aqueous coating composition of the present invention, a coating film excellent in the storage stability, as well as the abrasion resistance property, chipping resistance property and glass adhesion property, even when cured at a relatively low temperature, can be formed.

DESCRIPTION OF EMBODIMENTS

Hereinbelow, the present invention will be described in detail, however, these are examples of preferred embodiments and the present invention is not limited to the contents thereof.

[Aqueous Coating Composition]

The aqueous coating composition of the present invention is an aqueous coating composition comprising: a urethane resin (A) particle aqueous dispersion which is obtained from a component containing a secondary amino group- and alkoxysilyl group-containing compound (a1), and an isocyanate group-containing urethane prepolymer (a2); and a curing agent (B), wherein the secondary amino group- and alkoxysilyl group-containing compound (a1) is obtained from a component containing a primary amino group- and alkoxysilyl group-containing compound (a11) and a polymerizable unsaturated group-containing compound (a12), and the isocyanate group-containing urethane prepolymer (a2) is obtained from a component containing a polyisocyanate component (a21) and a polyol component (a22), and a content of the curing agent (B) is within a range of 5 to 50 mass % based on a total resin solid amount in the aqueous coating composition.

[Urethane Resin (A) Particle Aqueous Dispersion]

The urethane resin (A) particle aqueous dispersion of the present invention is a urethane resin (A) particle aqueous dispersion which is obtained from a component containing a secondary amino group- and alkoxysilyl group-containing compound (a1), and an isocyanate group-containing urethane prepolymer (a2), and the secondary amino group- and alkoxysilyl group-containing compound (a1) is obtained from a component containing a primary amino group- and alkoxysilyl group-containing compound (a11) and a polymerizable unsaturated group-containing compound (a12), and the isocyanate group-containing urethane prepolymer (a2) is obtained from a component containing a polyisocyanate component (a21) and a polyol component (a22).

Incidentally, the urethane resin (A) particle aqueous dispersion of the present invention may be an aqueous dispersion of modified urethane resin particles such as an acrylic modified urethane resin particle aqueous dispersion, and a polyester modified urethane resin particle aqueous dispersion, etc.

The urethane resin (A) particle aqueous dispersion may be produced by conventionally known urethane resin production methods, however, from the viewpoint of production stability, etc., it is preferable to produce the same by the following method (consisting of production steps 1 to 4 below).

Production step 1: A secondary amino group- and alkoxysilyl group-containing compound (a1) is synthesized by reacting a primary amino group- and alkoxysilyl group-containing compound (a11) with a polymerizable unsaturated group-containing compound (a12).

Production step 2: An isocyanate group-containing urethane prepolymer (a2) is synthesized from a component containing a polyisocyanate component (a21) and a polyol component (a22).

Production step 3: The secondary amino group- and alkoxysilyl group-containing compound (a1) obtained in production step 1 is added to the isocyanate group-containing urethane prepolymer (a2) obtained in production step 2, and the isocyanate group-containing urethane prepolymer (a2) and the secondary amino group- and alkoxysilyl group-containing compound (a1) are reacted to obtain urethane resin (A).

Production step 4: Deionized water is added to the urethane resin (A) and emulsified to obtain an aqueous dispersion. If necessary, the aqueous dispersion is further subjected to a chain extension reaction and solvent removal to obtain a urethane resin (A) particle aqueous dispersion.

[Production Step 1]

The secondary amino group- and alkoxysilyl group-containing compound (a1) is synthesized by reacting the primary amino group- and alkoxysilyl group-containing compound (a11) with the polymerizable unsaturated group-containing compound (a12).

Examples of the above-mentioned primary amino group- and alkoxysilyl group-containing compound (a11) include, for example, 3-aminopropyltrimethoxysilane, 3-aminopropyltriethoxysilane, N-2-(aminoethyl)-3-aminopropylmethyldimethoxysilane, N-2-(aminoethyl)-3-aminopropyltrimethoxysilane, etc.

These primary amino group- and alkoxysilyl group-containing compounds (a11) can be used alone or in combination of two types or more.

The above-mentioned primary amino group- and alkoxysilyl group-containing compound (a11) may be a commercially available product. Product names of commercially available products include “KBM-903”, “KBE-903”, “KBM-602”, and “KBM-603” (all product names manufactured by Shin-Etsu Chemical Co., Ltd.), “Dynasylan AMEO”, “Dynasylan AMMO”, “Dynasylan DAMO”, and “Dynasylan DAMO-T” (all product names manufactured by Evonik Industries AG), “DOWSIL Z-6610 Silane”, “DOWSIL Z-6611 Silane”, “DOWSIL Z-6094 Silane”, and “XIAMETER OFS-6020 Silane” (all product names manufactured by Dow Toray Co., Ltd.), “A-1100”, “A-1110”, “A-1120”, and “A-2120” (all product names manufactured by Momentive Performance Materials), etc.

The above-mentioned primary amino group- and alkoxysilyl group-containing compound (a11) preferably includes a primary amino group-, secondary amino group-, and alkoxysilyl group-containing compound (a11-1) from the viewpoint of chipping resistance property, etc. of the coating film to be formed.

Examples of the above-mentioned primary amino group-, secondary amino group-, and alkoxysilyl group-containing compound (a11-1) include N-2-(aminoethyl)-3-aminopropylmethyldimethoxysilane, N-2-(aminoethyl)-3-aminopropyltrimethoxysilane, etc.

The above-mentioned primary amino group-, secondary amino group-, and alkoxysilyl group-containing compound (a11-1) may be a commercially available product. Product names of commercially available products include “KBM-602”, and “KBE-603” (all product names manufactured by Shin-Etsu Chemical Co., Ltd.), “Dynasylan DAMO”, and “Dynasylan DAMO-T” (all product names manufactured by Evonik Industries AG), “DOWSIL Z-6094 Silane”, and “XIAMETER OFS-6020 Silane” (all product names manufactured by Dow Toray Co., Ltd.), “A-1120”, and “A-2120” (all product names manufactured by Momentive Performance Materials), etc.

In a case where the above-mentioned primary amino group- and alkoxysilyl group-containing compound (a11) includes a primary amino group-, secondary amino group-, and alkoxysilyl group-containing compound (a11-1), the content of the primary amino group-, secondary amino group-, and alkoxysilyl group-containing compound (a11-1) is preferably within a range of 20 to 100 mass %, more preferably within a range of 50 to 100 mass %, and even more preferably within a range of 90 to 100 mass %, based on the total solid amount of the primary amino group- and alkoxysilyl group-containing compound (a11), from the viewpoint of chipping resistance property, etc. of the coating film to be formed.

The above-mentioned polymerizable unsaturated groups are radically polymerizable unsaturated groups, and specifically, for example, acryloyl group, methacryloyl group, vinyl group, allyl group, propenyl group, isopropenyl group, maleimide group, vinyl ether group, etc., may be cited. Among these polymerizable unsaturated groups, acryloyl group and methacryloyl group are preferable, and acryloyl group is particularly preferable, from the viewpoint of excellent reactivity, etc.

In the present description, “(meth)acrylate” is referred to as “acrylate and/or methacrylate”. “(Meth)acrylic acid” is referred to as “acrylic acid and/or methacrylic acid”. “(Meth)acryloyl” is referred to as “acryloyl and/or methacryloyl”. “(Meth)acrylamide” is referred to as “acrylamide and/or methacrylamide”.

The above-mentioned polymerizable unsaturated group-containing compounds (a12) include, for example, hydroxyl group-containing polymerizable unsaturated monomers such as monoesterified products of (meth)acrylic acid and dihydric alcohols having 2 to 8 carbon atoms, such as 2-hydroxyethyl (meth)acrylate, 2-hydroxypropyl (meth) acrylate, 3-hydroxypropyl (meth)acrylate, 4-hydroxybutyl (meth)acrylate, etc., s-caprolactone modified products of the aforementioned monoesterified products, N-hydroxymethyl (meth)acrylamide, allyl alcohol, (meth)acrylates having a polyoxyethylene chain with a hydroxyl group at a molecular termail, etc.; alkyl or cycloalkyl (meth)acrylate such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, “isostearyl acrylate” (product name, manufactured by OSAKA ORGANIC CHEMICAL INDUSTRY LTD.), cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.; polymerizable unsaturated monomers having an isobornyl group such as isobornyl (meth)acrylate, etc; adamantyl group-containing polymerizable unsaturated monomers such as adamantyl (meth)acrylate, etc.; tricyclodecenyl group-containing polymerizable unsaturated monomers such as tricyclodecenyl (meth)acrylate, etc.; aromatic ring-containing polymerizable unsaturated monomers such as benzyl (meth)acrylate, styrene, α-methylstyrene, vinyltoluene, etc.; alkoxysilyl group-containing polymerizable unsaturated monomers such as vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, etc.; perfluoralkyl (meth)acrylate such as perfluorobutylethyl (meth)acrylate, perfluorooctylethyl (meth)acrylate, etc.; fluorinated alkyl group-containing polymerizable unsaturated monomers such as fluoroolefin, etc.; photopolymerizable functional group-containing polymerizable unsaturated monomers, the photopolymerizable functional group being maleimide group, etc.; vinyl compounds such as N-vinylpyrrolidone, ethylene, butadiene, chloroprene, vinyl propionate, vinyl acetate, etc.; carboxyl group-containing polymerizable unsaturated monomers such as (meth)acrylic acid, maleic acid, crotonic acid, β-carboxyethyl acrylate, etc.; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, adducts of glycidyl (meth)acrylate and amines, etc.; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.; (meth)acrylate having a polyoxyethylene chain the molecular terminal of which is an alkoxy group; glycerol di(meth)acrylate, 1,1,1-trishydroxymethylethane di(meth)acrylate, allyl (meth)acrylate, ethylene glycol di(meth)acrylate, triethylene glycol di(meth) acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol tetra(meth)acrylate, 1,1,1-trishydroxymethylethane tri(meth)acrylate, 1,1,1-trishydroxymethylpropane tri(meth)acrylate, methylene bis(meth)acrylamide, ethylene bis(meth)acrylamide, triallyl isocyanurate, diallyl terephthalate, divinylbenzene, polyethylene glycol di(meth)acrylate, polytetramethylene glycol di(meth)acrylate, etc.

These polymerizable unsaturated group-containing compound (a12) can be used alone or in combination of two types or more.

From the viewpoints of the storage stability of the aqueous coating composition to be obtained, and the abrasion resistance property, chipping resistance property, and glass adhesion property, etc., of the coating film to be formed, the above-mentioned polymerizable unsaturated group-containing compound (a12) preferably includes a (meth)acrylate, more preferably includes an alkyl or cycloalkyl (meth) acrylate, further preferably includes an alkyl (meth)acrylate having an alkyl group with a carbon number in the range of 2 to 6, and particularly preferably includes an alkyl (meth) acrylate having an alkyl group with a carbon number in the range of 3 to 6.

The above-mentioned (meth)acrylates include, for example, monoesterified products of (meth)acrylic acid and dihydric alcohols having 2 to 8 carbon atoms, such as 2-hydroxyethyl (meth)acrylate, 2-hydroxypropyl (meth) acrylate, 3-hydroxypropyl (meth)acrylate, 4-hydroxybutyl (meth)acrylate, etc., s-caprolactone modified products of the aforementioned monoesterified products, (meth)acrylates having a polyoxyethylene chain with a hydroxyl group at a molecular terminal, methyl (meth)acrylate, ethyl (meth) acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth) acrylate, “isostearyl acrylate” (product name, manufactured by OSAKA ORGANIC CHEMICAL INDUSTRY LTD.), cyclohexyl (meth)acrylate, methylcyclohexyl (meth)acrylate, t-butylcyclohexyl (meth)acrylate, cyclododecyl (meth) acrylate, tricyclodecanyl (meth)acrylate, isobornyl (meth) acrylate, adamantyl (meth)acrylate, tricyclodecenyl (meth) acrylate, benzyl (meth)acrylate, perfluorobutylethyl (meth) acrylate, perfluorooctylethyl (meth)acrylate, β-carboxyethyl acrylate, nitrogen-containing polymerizable unsaturated monomers such as N,N-dimethylaminoethyl (meth)acrylate, N,N-dimethylaminoethyl (meth)acrylate, adducts of glycidyl (meth)acrylate and amines, etc., glycidyl (meth)acrylate, β-methylglycidyl (meth)acrylate, 3,4-epoxycyclohexylmethyl (meth)acrylate, 3,4-epoxycyclohexylethyl (meth) acrylate, 3,4-epoxycyclohexylpropyl (meth)acrylate, (meth) acrylate having a polyoxyethylene chain with an alkoxy group at a molecular terminal; glycerol di(meth)acrylate, 1,1,1-trishydroxymethylethane di(meth)acrylate, allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth) acrylate, pentaerythritol tetra(meth)acrylate, 1,1,1-trishydroxymethylethane tri(meth)acrylate, 1,1,1-trishydroxymethylpropane tri(meth)acrylate, polyethylene glycol di(meth)acrylate, polytetramethylene glycol di(meth)acrylate, etc.

In a case where the above-mentioned polymerizable unsaturated group-containing compound (a12) includes (meth)acrylate, from the viewpoints of the storage stability of the aqueous coating composition to be obtained, and the abrasion resistance property and glass adhesion property, etc., of the coating film to be formed, the content of the (meth)acrylate is preferably within the range of 20 to 100 mass %, more preferably within the range of 50 to 100 mass %, and even more preferably within the range of 90 to 100 mass %, based on the total solid amount of the polymerizable unsaturated group-containing compound (a12).

The above-mentioned alkyl or cycloalkyl (meth)acrylate includes, for example, methyl (meth)acrylate, ethyl (meth) acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth) acrylate, “isostearyl acrylate” (product name, manufactured by OSAKA ORGANIC CHEMICAL INDUSTRY LTD.), cyclohexyl (meth)acrylate, methylcyclohexyl (meth)acrylate, t-butylcyclohexyl (meth)acrylate, cyclododecyl (meth) acrylate, tricyclodecanyl (meth)acrylate, etc.

In a case where the above-mentioned polymerizable unsaturated group-containing compound (a12) includes alkyl or cycloalkyl (meth)acrylate, from the viewpoints of the storage stability of the aqueous coating composition to be obtained, and the abrasion resistance property and glass adhesion property, etc., of the coating film to be formed, the content of the alkyl or cycloalkyl (meth)acrylate is preferably within the range of 20 to 100 mass %, more preferably within the range of 50 to 100 mass %, and even more preferably within the range of 90 to 100 mass %, based on the total solid amount of the polymerizable unsaturated group-containing compound (a12).

The above-mentioned alkyl (meth)acrylate having an alkyl group with a carbon number in the range of 2 to 6 includes, for example, ethyl (meth)acrylate, n-propyl (meth) acrylate, i-propyl (meth)acrylate, n-butyl (meth)acrylate, i-butyl (meth)acrylate, tert-butyl (meth)acrylate, n-hexyl (meth)acrylate, etc.

In a case where the above-mentioned polymerizable unsaturated group-containing compound (a12) includes alkyl (meth)acrylate having an alkyl group with a carbon number in the range of 2 to 6, from the viewpoints of the storage stability of the aqueous coating composition to be obtained, and the abrasion resistance property and glass adhesion property, etc., of the coating film to be formed, the content of the alkyl (meth)acrylate having an alkyl group with a carbon number in the range of 2 to 6 is preferably within the range of 20 to 100 mass %, more preferably within the range of 50 to 100 mass %, and even more preferably within the range of 90 to 100 mass %, based on the total solid amount of the polymerizable unsaturated group-containing compound (a12).

The above-mentioned alkyl (meth)acrylate having an alkyl group with a carbon number in the range of 3 to 6 includes, for example, n-propyl (meth)acrylate, i-propyl (meth)acrylate, n-butyl (meth)acrylate, i-butyl (meth)acrylate, tert-butyl (meth)acrylate, n-hexyl (meth)acrylate, etc.

In a case where the above-mentioned polymerizable unsaturated group-containing compound (a12) includes alkyl (meth)acrylate having an alkyl group with a carbon number in the range of 3 to 6, from the viewpoints of the storage stability of the aqueous coating composition to be obtained, and the abrasion resistance property and glass adhesion property, etc., of the coating film to be formed, the content of the alkyl (meth)acrylate having an alkyl group with a carbon number in the range of 3 to 6 is preferably within the range of 20 to 100 mass %, more preferably within the range of 50 to 100 mass %, and even more preferably within the range of 90 to 100 mass %, based on the total solid amount of the polymerizable unsaturated group-containing compound (a12).

The synthesis of the above-mentioned secondary amino group- and alkoxysilyl group-containing compound (a1) is preferably carried out at a temperature within the range of 30 to 100° C. In the synthesis of the above-mentioned secondary amino group- and alkoxysilyl group-containing compound (a1), an organic solvent that does not interfere with the reaction between the above-mentioned primary amino group- and alkoxysilyl group-containing compound (a11) and the polymerizable unsaturated group-containing compound (a12) can be used. Examples of such organic solvents include, for example, aromatic hydrocarbon-based solvents such as toluene, xylene, etc., alicyclic hydrocarbon-based solvents such as cyclohexane, methylcyclohexane, etc., and ester-based solvents such as ethyl acetate, butyl acetate, etc. Among the above-mentioned organic solvents, alicyclic hydrocarbon-based solvents and ester-based solvents can be preferably used. These organic solvents can be used alone or in combination of two types or more.

In addition, an antioxidant can be added to the synthesis of the above-mentioned secondary amino group- and alkoxysilyl group-containing compound (a1), if necessary.

The above-mentioned antioxidants include, for example, dibutylhydroxytoluene, hydroquinone, methylhydroquinone, t-butylhydroquinone, etc.

The mass ratio (a11)/(a12) of the primary amino group- and alkoxysilyl group-containing compound (a11) and the polymerizable unsaturated group-containing compound (a12) in the above-mentioned secondary amino group- and alkoxysilyl group-containing compound (a1) is preferably within the range of 25/75 to 60/40, more preferably within the range of 35/65 to 55/45, and even more preferably within the range of 40/60 to 50/50, with respect to 100 parts by mass of the total of the primary amino group- and alkoxysilyl group-containing compound (a11) and the polymerizable unsaturated group-containing compound (a12), from the viewpoints of the storage stability of the aqueous coating composition to be obtained, and the abrasion resistance property, chipping resistance property, and glass adhesion property, etc., of the coating film to be formed.

[Production Step 2]

The isocyanate group-containing urethane prepolymer (a2) is synthesized which can be obtained from a component containing a polyisocyanate component (a21) and a polyol component (a22). The isocyanate group-containing urethane prepolymer (a2) may further contain, as a component, a compound that combines an active hydrogen group and an ion-forming group as a water-dispersible group-imparting component, if necessary.

[Polyisocyanate Component (a21)]

The polyisocyanate component (a21) contains, for example, alicyclic polyisocyanate (a21-1), aliphatic polyisocyanate, araliphatic polyisocyanate, aromatic polyisocyanate, derivatives of the aforementioned polyisocyanate, etc.

From the viewpoints of the abrasion resistance property and glass adhesion property, etc., of the coating film to be formed, it is preferable that the above-mentioned polyisocyanate component (a21) contains alicyclic polyisocyanate (a21-1).

The above-mentioned alicyclic polyisocyanate (a21-1) includes, for example, alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl) cyclohexane (common name: hydrogenated xylylene diisocyanate) or a mixture thereof, methylenebis(4,1-cyclohexanediyl)diisocyanate (common name: hydrogenated MDI), norbornane diisocyanate, etc.; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane, etc.

In a case where the above-mentioned polyisocyanate component (a21) includes above-mentioned alicyclic polyisocyanate (a21-1), from the viewpoints of the abrasion resistance property, chipping resistance property, and glass adhesion property, etc., of the coating film to be formed, the content of the alicyclic polyisocyanate (a21-1) is preferably within the range of 50 to 100 mass %, more preferably within the range of 70 to 100 mass %, and even more preferably within the range of 90 to 100 mass %, based on the total solid amount of the polyisocyanate component (a21).

The above-mentioned aliphatic polyisocyanates include, for example, aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4 or 2,2,4-trimethylhexamethylene diisocyanate, dimer acid diisocyanate, 2,6-methyl diisocyanatohexanoate (common name: lysine diisocyanate), etc.; and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane, etc.

The above-mentioned araliphatic polyisocyanates include, for example, araliphatic diisocyanates such as methylenebis(4,1-phenylene)diisocyanate (common name: MDI), 1,3- or 1,4-xylylene diisocyanate or mixtures thereof, ω,ω'-diisocyanato-1,4-diethylbenzene, 1,3- or 1,4-bis(1-isocyanato-1-methylethyl)benzene (common name: tetramethylxylylene diisocyanate) or mixtures thereof, etc.; and araliphatic triisocyanates such as 1,3,5-triisocyanatomethylbenzene, etc.

The above-mentioned aromatic polyisocyanates include, for example, aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or a mixture thereof, 4,4'-toluidine diisocyanate, 4,4'-diphenyl ether diisocyanate, etc.; aromatic triisocyanates such as triphenylmethane-4,4',4"-triisocyanate, 1,3,5-triisocyanatobenzene, 2,4,6-triisocyanatotoluene, etc.; and aromatic tetraisocyanates such as 4,4'-diphenylmethane-2,2',5,5'-tetraisocyanate, etc.

Furthermore, the above-mentioned polyisocyanate derivatives include, for example, dimers, trimers, biurets, allophanates, uretdione, uretoimine, isocyanurates, oxadiazinetriones, polymethylene polyphenyl polyisocyanates (crude MDI, polymeric MDI), crude TDI, etc., of the above-mentioned polyisocyanates. The above-mentioned polyisocyanates and the derivatives thereof may be used alone or in combination of two or more types.

The above-mentioned polyisocyanates may be used in the form of blocked isocyanates blocked with a blocking agent.

The above-mentioned blocking agents include, for example, phenol-based agents such as phenol, cresol, xylenol, nitrophenol, ethylphenol, hydroxydiphenyl, butylphenol, isopropylphenol, nonylphenol, octylphenol, methyl hydroxybenzoate, etc.; lactam-based agents such as ε-caprolactam, δ-valerolactam, γ-butyrolactam, β-propiolactam, etc.; aliphatic alcohol-based agents such as methanol, ethanol, propyl alcohol, butyl alcohol, amyl alcohol, lauryl alcohol, etc.; ether-based agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, etc.; alcohol-based agents such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, 2-hydroxyethyl methacrylate, etc.; oxime-based agents such as formamide oxime, acetamide oxime, acetoxime, methyl ethyl ketoxime, diacetyl monooxime, benzophenone oxime, cyclohexane oxime, etc.; active methylene-based agents such as dimethyl malonate, diethyl malonate, ethyl acetoacetate, methyl acetoacetate, acetylacetone, etc.; mercaptan-based agents such as butyl mercaptan, t-butyl mercaptan, hexyl mercaptan, t-dodecyl mercaptan, 2-mercaptobenzothiazole, thiophenol, methyl thiophenol, ethyl thiophenol, etc.; acid amide-based agents such as acetanilide, acetaniside, acetotoluide, acrylamide, methacrylamide, acetate amide, stearic acid amide, benzamide, etc.; imide-based agents such as succinimide, phthalic acid imide, maleic acid imide, etc.; amine-based agents such as diphenylamine, phenylnaphthylamine, xylidine, N-phenylxylidine, carbazole, aniline, naphthylamine, butylamine, dibutylamine, butylphenylamine, etc.; imidazole-based agents such as imidazole, 2-ethylimidazole, etc.; urea-based agents such as urea, thiourea, ethyleneurea, ethylenethiourea, diphenylurea, etc.; carbamate ester-based agents such as N-phenylphenylcarbamate, etc.; imine-based agents such as ethyleneimine, propyleneimine, etc.; sulfite-based agents such as sodium bisulfite, potassium bisulfite, etc.; and azole-based agents, etc. Examples of the above-mentioned azole-based agents include pyrazole or pyrazole derivatives such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole, etc.; imidazole or imidazole derivatives such as imidazole, benzimidazole, 2-methylimidazole, 2-ethylimidazole, 2-phenylimidazole, etc.; and imidazoline derivatives such as 2-methylimidazoline, 2-phenylimidazoline, etc.

When performing the above-mentioned blocking (reacting with a blocking agent), a solvent can be added if necessary. Solvents used in blocking reactions are preferably those that are not reactive with isocyanate groups, and examples thereof include, for example, ketones such as acetone and methyl ethyl ketone, esters such as ethyl acetate, and N-methyl-2-pyrrolidone (NMP).

[Polyol Component (a22)]

Polyol component (a22) is a compound having at least two hydroxyl groups in one molecule. The above-mentioned polyol component (a22) preferably includes at least one type of polyol selected from polycarbonate polyol (a22-1) and polyether polyol (a22-2), and it is more preferable to include both of the polycarbonate polyol (a22-1) and the polyether polyol (a22-2), from the viewpoints of the storage stability of the aqueous coating composition to be obtained, and the abrasion resistance property, chipping resistance property, and glass adhesion property, etc., of the coating film to be formed.

The above-mentioned polycarbonate polyol (a22-1) is a compound obtained by polycondensation reaction of a known polyol component with a carbonylating agent by a conventional method. Examples of the polyol component include polyhydric alcohol components such as diol components, trihydric or higher alcohols, etc.

The above-mentioned diol components include linear diols such as 1,3-propanediol, 1,4-butanediol, 1,5-pentanediol, 1,6-hexanediol, 1,7-heptanediol, 1,8-octanediol, 1,9-nonanediol, and 1,10-decanediol, etc.; branched diols such as 2-methyl-1,3-propanediol, 3-methyl-1,5-pentanediol, neopentyl glycol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, 2-ethyl-1,3-hexanediol, etc.; alicyclic diols such as 1,3-cyclohexanediol, 1,4-cyclohexanediol, 1,4-cyclohexanedimethanol, 2,2,4,4-tetramethyl-1,3-cyclobutanediol, etc.; aromatic diols such as p-xylenediol, p-tetrachloroxylenediol, etc.; and ether-based diols such as diethylene glycol, dipropylene glycol, etc. These diol components can be used alone or in combination of two or more types.

The above-mentioned trihydric or higher alcohols include glycerin, trimethylolethane, trimethylolpropane, a dimer of trimethylolpropane, pentaerythritol, etc. These trihydric or higher alcohols can be used alone or in combination of two or more.

As the above-mentioned carbonylating agents, the ones publicly known can be used. Specifically, the above-mentioned carbonylating agents may include, for example, alkylene carbonate, dialkyl carbonate, diallyl carbonate, phosgene, etc., and these can be used alone or in combination of two or more. Among the aforementioned, preferred ones include ethylene carbonate, propylene carbonate, dimethyl carbonate, diethyl carbonate, dibutyl carbonate, diphenyl carbonate, etc.

The number average molecular weight of the above-mentioned polycarbonate polyol (a22-1) is preferably within the range of 1,000 to 5,000, more preferably within the range of 1,300 to 4,500, and even more preferably within the range of 1,500 to 3,500, from the viewpoint of chipping resistance property, etc., of the coating film to be formed.

In a case where the above-mentioned polyol component (a22) includes above-mentioned polycarbonate polyol (a22-1), from the viewpoints of the abrasion resistance property, chipping resistance property, and glass adhesion property, etc., of the coating film to be formed, the content of the polycarbonate polyol (a22-1) is preferably within the range of 20 to 70 mass %, more preferably within the range of 25 to 60 mass %, and even more preferably within the range of 30 to 50 mass %, based on the total solid amount of the polyol component (a22).

As the above-mentioned polyether polyol (a22-2), an alkylene oxide adduct of a low molecular weight polyol which will be described later, a ring-opening (co)polymer of an alkylene oxide or a cyclic ether (tetrahydrofuran, etc.), etc., can be used. Specific examples include, for example, polyethylene glycol, polypropylene glycol, polytetramethylene glycol, a (block or random) copolymer of ethylene glycol-propylene glycol, polyhexamethylene glycol, polyoctamethylene glycol, etc. The above-mentioned polyether polyols can be used alone or in combination of two or more.

The number average molecular weight of the above-mentioned polyether polyol (a22-2) is preferably within the range of 500 to 10,000, more preferably within the range of 1,000 to 5,000, and even more preferably within the range of 1,600 to 4,000, from the viewpoints of the storage stability of the aqueous coating composition to be obtained, and the abrasion resistance property, chipping resistance property, and glass adhesion property, etc., of the coating film to be formed.

In a case where the above-mentioned polyol component (a22) includes above-mentioned polyether polyol (a22-2), from the viewpoints of the abrasion resistance property, chipping resistance property, and glass adhesion property, etc., of the coating film to be formed, the content of the polyether polyol (a22-2) is preferably within the range of 25 to 80 mass %, more preferably within the range of 30 to 70 mass %, and even more preferably within the range of 40 to 60 mass %, based on the total solid amount of the polyol component (a22).

The above-mentioned polyether polyol (a22-2) preferably includes polytetramethylene ether glycol from the viewpoints of the storage stability of the aqueous coating composition to be obtained, and the chipping resistance property of the coating film to be formed, etc.

In a case where the above-mentioned polyether polyol (a22-2) includes polytetramethylene ether glycol, from the viewpoints of the storage stability of the aqueous coating composition to be obtained, and the chipping resistance property, etc., of the coating film to be formed, the content of the polytetramethylene ether glycol is preferably within the range of 50 to 100 mass %, more preferably within the range of 70 to 100 mass %, and even more preferably within the range of 90 to 100 mass %, based on the total solid amount of the polyether polyol (a22-2).

In a case where the above-mentioned polyol component (a22) includes the above-mentioned polycarbonate polyol (a22-1) and the above-mentioned polyether polyol (a22-2), the mass ratio (a22-1)/(a22-2) of the polycarbonate polyol (a22-1) and the polyether polyol (a22-2) is preferably within the range of 10/90 to 90/100, more preferably within the range of 20/80 to 70/30, and even more preferably within the range of 30/70 to 60/40, with respect to 100 parts by mass of the total mass of the above-mentioned polycarbonate polyol (a22-1) and the above-mentioned polyether polyol (a22-2), from the viewpoints of the abrasion resistance property, chipping resistance property, and glass adhesion property, etc., of the coating film to be formed.

The above-mentioned polyol component (a22) may include another polyol component (a22-3) other than polycarbonate polyol (a22-1) and polyether polyol (a22-2).

The another polyol component (a22-3) may include, for example, low molecular weight polyols such as ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecane dimethanol, 1,4-cyclohexane dimethanol, etc. These low molecular weight polyols may be used alone or in combination of two or more.

Furthermore, as the another polyol component (a22-3), for example, high molecular weight polyols such as polyester polyols, polyether ester polyols, etc., can be used. These high molecular weight polyols can be used alone or in combination of two or more.

The above-mentioned polyester polyols include those obtained by polycondensing dicarboxylic acids (anhydrides) such as adipic acid, succinic acid, sebacic acid, glutaric acid, maleic acid, fumaric acid, phthalic acid, etc. with the above-mentioned low molecular weight polyols such as ethylene glycol, propylene glycol, 1,4-butanediol, 1,6-hexanediol, 1,8-octamethylenediol, neopentyl glycol, etc., under conditions of excess hydroxyl groups. Specific examples include, for example, ethylene glycol-adipic acid condensate, butanediol-adipic acid condensate, hexamethylene glycol-adipic acid condensate, ethylene glycol-propylene glycol-adipic acid condensate, and polylactone polyols obtained by ring-opening polymerization of lactones using glycol as an initiator, etc. These polyester polyols can be used alone or in combination of two or more.

The above-mentioned polyether ester polyols include ether group-containing polyols (the above-mentioned polyether polyol (a22-2) or diethylene glycol, etc.) or those obtained by mixtures of the same with other glycols being added to dicarboxylic acid (anhydride) as exemplified in the above-mentioned polyester polyols, whereby reacting alkylene oxides, such as polytetramethylene glycol-adipic acid condensates, etc. These polyether ester polyols can be used alone or in combination of two or more.

[Compounds Having Both Active Hydrogen Group and Ion-Forming Group]

Compounds having both an active hydrogen group and an ion-forming group include, for example, compounds having two or more hydroxyl groups and one or more carboxyl groups in one molecule, compounds having two or more hydroxyl groups and one or more sulfonic acid groups in one molecule, compounds having two or more amino groups and one or more carboxyl groups in one molecule, etc. These can be used alone or in combination of two or more types.

Among the compounds having both the above-mentioned active hydrogen group and ion-forming group, compounds having two or more hydroxyl groups and one or more carboxyl groups in one molecule, and compounds having two or more hydroxyl groups and one or more sulfonic acid groups in one molecule can be preferably used.

In the present invention, compounds having both two or more hydroxyl groups and ion-forming groups, such as the above-mentioned compounds having two or more hydroxyl groups and one or more carboxyl groups in one molecule, and compounds having two or more hydroxyl groups and one or more sulfonic acid groups in one molecule, are included in the above-mentioned polyol component (a22).

The above-mentioned compounds having two or more hydroxyl groups and one or more carboxyl groups in one molecule include, for example, alkanol carboxylic acid compounds such as dimethylolpropionic acid, dimethylolacetic acid, dimethylolbutanoic acid, dimethylolheptanoic acid, dimethylolnonanoic acid, 1-carboxy-1,5-pentylenediamine, dihydroxybenzoic acid, 3,5-diaminobenzoic acid, etc., and half ester compounds of polyoxypropylenetriol and maleic anhydride and/or phthalic anhydride, etc.

The above-mentioned compounds having two or more hydroxyl groups and one or more sulfonic acid groups in one molecule include, for example, 2-sulfonic acid-1,4-butanediol, 5-sulfonic acid-di-β-hydroxyethyl isophthalate, N,N-bis(2-hydroxyethyl)aminoethylsulfonic acid, etc.

In a case where the above-mentioned polyol component (a22) contains the above-mentioned compound having two or more hydroxyl groups and one or more carboxyl groups, the content thereof is preferably within the range of 1 to 30 mass %, more preferably within the range of 1 to 25 mass %, and even more preferably within the range of 1 to 20 mass %, based on the total amount of the compound constituting the polyol component (a22), from the viewpoint of storage stability, etc., of the aqueous coating composition to be obtained.

The method of producing the isocyanate group-containing urethane prepolymer (a2) is not particularly limited, and a conventionally known method can be applied. As the production method, for example, in an organic solvent, the polyisocyanate component (a21) and the polyol component (a22) are subjected to a urethane reaction, or if necessary, a compound having both an active hydrogen group and an ion-forming group is further added and subjected to a urethane reaction, thereby the same is synthesized.

The above-mentioned isocyanate group-containing urethane prepolymer (a2) preferably includes the above-mentioned compound having both active hydrogen group and an ion-forming group from the viewpoint of the storage stability of the aqueous coating composition to be obtained, etc.

A catalyst can be used for the urethane reaction of the above-mentioned polyisocyanate component (a21) and the polyol component (a22), if necessary.

The above-mentioned catalysts include, for example, bismuth carboxylate compounds such as tris(2-ethylhexanoate) bismuth(III), etc.; organotin compounds such as dibutyltin dilaurate, dibutyltin dioctoate, stannous octoate, etc.; tertiary amine compounds such as triethylamine, triethylenediamine, etc.

The above-mentioned urethane reaction is preferably carried out at 50 to 120° C.

In the synthesis of the above-mentioned isocyanate group-containing urethane prepolymer (a2), an organic solvent that is inactive to isocyanates and does not interfere with the urethane reaction can be used. Examples of such organic solvents include, for example, aromatic hydrocarbon-based solvents such as toluene, xylene, etc., ester-based solvents such as ethyl acetate, butyl acetate, etc., and ketone-based solvents such as acetone, methyl ethyl ketone, etc. Among the aforementioned, ketone-based solvents and ester-based solvents can be preferably used from the viewpoint of water dispersion stability, etc. These organic solvents can be used alone or in combination of two types or more.

The content ratio of the polyisocyanate component (a21) and the polyol component (a22) in the isocyanate group-containing urethane prepolymer (a2) is preferably within the range of 1/1.01 to 1/3.0, and more preferably within the range of 1/1.05 to 1/2.0, in terms of the molar ratio of the active hydrogen group in the polyol component (a22) to the isocyanate group in the polyisocyanate component (a21), from the viewpoint of manufacturability, etc.

The number average molecular weight of the above-mentioned isocyanate group-containing urethane prepolymer (a2) is preferably within the range of 1,000 to 20,000, more preferably within the range of 2,000 to 15,000, and even more preferably within the range of 2,500 to 10,000, from the viewpoints of the abrasion resistance property, chipping resistance property, and glass adhesion property, etc., of the coating film to be formed.

Incidentally, in the present description, the average molecular weight is a value calculated based on the molecular weight of standard polystyrene from a chromatogram measured by a gel permeation chromatograph. The gel permeation chromatograph used was "HLC8120GPC" (manufactured by TOSOH CORPORATION). Four columns, "TSKgel G-4000HXL", "TSKgel G-3000HXL", "TSKgel G-2500HXL", and "TSKgel G-2000HXL" (all product names manufactured by TOSOH CORPORATION), were used, and the conditions were as follows: mobile phase: tetrahydrofuran, measurement temperature: 40° C., flow rate: 1 mL/min, and detector: RI.

[Production Step 3]

The secondary amino group- and alkoxysilyl group-containing compound (a1) obtained in Production Step 1 is added to the isocyanate group-containing urethane prepolymer (a2) obtained in Production Step 2, and the isocyanate group-containing urethane prepolymer (a2) is reacted with the secondary amino group- and alkoxysilyl group-containing compound (a1), whereby the urethane resin (A) is obtained.

The reaction of the above-mentioned isocyanate group-containing urethane prepolymer (a2) and the secondary amino group- and alkoxysilyl group-containing compound (a1) is preferably carried out at a temperature within the range of 40 to 100° C.

In the reaction of the above-mentioned isocyanate group-containing urethane prepolymer (a2) with the secondary amino group- and alkoxysilyl group-containing compound (a1), the mass ratio (a1)/(a2) of the isocyanate group-containing urethane prepolymer (a2) and the secondary amino group- and alkoxysilyl group-containing compound (a1) is preferably within the range of 1/99 to 20/80, more preferably within the range of 2/98 to 10/90, and even more preferably within the range of 3/97 to 6/94, with respect to 100 parts by mass of the total mass of the isocyanate group-containing urethane prepolymer (a2) and the secondary amino group- and alkoxysilyl group-containing compound (a1), from the viewpoints of the abrasion resistance property and glass adhesion property, etc., of the coating film to be formed.

[Production Step 4]

Deionized water is added to the urethane resin (A) and emulsified, whereby an aqueous dispersion is obtained. If necessary, the aqueous dispersion is subjected to a chain extension reaction and solvent removal, whereby the urethane resin (A) particle aqueous dispersion is obtained.

When deionized water is added to the urethane resin (A), a neutralizing agent for the above-mentioned ion-forming group may be added to the urethane resin (A), if necessary.

The above-mentioned neutralizing agent is not particularly limited as long as it can neutralize the above-mentioned ion-forming groups, and examples of basic compounds for neutralization include, for example, organic amines such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine, diethylenetriamine, N-methylmorpholine, N-ethylmorpholine, etc.; or alkali metal hydroxides such as sodium hydroxide, potassium hydroxide, etc. These neutralizing agents can be used alone or in combination of two or more.

The above-mentioned neutralizing agent is preferably used in an amount that will ultimately result in a pH of the urethane resin (A) particle aqueous dispersion of approximately 6.0 to 9.0. In a case where the above-mentioned neutralizing agent is added to the urethane resin (A), the amount of the neutralizing agent added is preferably 0.1 to 1.5 equivalents, and more preferably 0.3 to 1.2 equivalents, with respect to the acid groups of the carboxyl groups, etc.

In order to improve the aqueous dispersion stability of the above-mentioned urethane resin (A) particle aqueous dispersion, an emulsifier such as a surfactant, etc., can also be used. As the above-mentioned emulsifier, well-known general anionic surfactants, nonionic surfactants, cationic surfactants, amphoteric surfactants, polymeric surfactants, reactive surfactants, etc., can be used. In a case of using these, anionic surfactants, nonionic surfactants, or cationic surfactants are preferable because they are low in cost and provide satisfactory emulsification.

The above-mentioned anionic surfactants include, for example, alkyl sulfates such as sodium dodecyl sulfate, potassium dodecyl sulfate, etc., ammonium dodecyl sulfate, etc.; sodium dodecyl polyglycol ether sulfate; sodium sulforicinolate; alkyl sulfonates such as alkali metal salts of sulfonated paraffins, ammonium salts of sulfonated paraffins, etc.; fatty acid salts such as sodium laurate, triethanolamine oleate, triethanolamine abietate, etc.; alkylaryl sulfonates such as sodium benzenesulfonate, alkali metal sulfates of alkali phenol hydroxyethylene, etc.; high alkyl naphthalene sulfonates; naphthalene sulfonate formalin condensates; dialkyl sulfosuccinates; polyoxyethylene alkyl sulfate salts; polyoxyethylene alkylaryl sulfate salts, etc.

The above-mentioned nonionic surfactants include ethylene oxide and/or propylene oxide adducts of alcohols having 1 to 18 carbon atoms, ethylene oxide and/or propylene oxide adducts of alkylphenols, ethylene oxide and/or propylene oxide adducts of alkylene glycols and/or alkylenediamines, etc.

The above-mentioned alcohols having 1 to 18 carbon atoms constituting the nonionic surfactant include methanol, ethanol, propanol, 2-propanol, butanol, 2-butanol, tertiary butanol, amyl alcohol, isoamyl alcohol, tertiary amyl alcohol, hexanol, octanol, decane alcohol, lauryl alcohol, myristyl alcohol, palmityl alcohol, stearyl alcohol, etc., the alkylphenols include phenol, methylphenol, 2,4-di-tertiary butylphenol, 2,5-di-tertiary butylphenol, 3,5-di-tertiary butylphenol, 4-(1,3-tetramethylbutyl)phenol, 4-isooctylphenol, 4-nonylphenol, 4-tertiary octylphenol, 4-dodecylphenol, 2-(3,5-dimethylheptyl)phenol, 4-(3,5-dimethylheptyl) phenol, naphthol, bisphenol A, bisphenol F, etc., the alkylene glycols include ethylene glycol, 1,2-propanediol, 1,3-propanediol, 2-methyl-1,3-propanediol, 2-butyl-2-ethyl-1,3-propanediol, 1,4-butanediol, neopentyl glycol, 1,5-pentanediol, 3-methyl-1,5-pentanediol, 2,4-diethyl-1,5-pentanediol, 1,6-hexanediol, etc., and the alkylene diamines include those in which the alcoholic hydroxyl group of these alkylene glycols is substituted with an amino group. The ethylene oxide and propylene oxide adducts may be random adducts or block adducts.

The above-mentioned cationic surfactants include quaternary ammonium salts such as primary to tertiary amine salts, pyridinium salts, alkyl pyridinium salts, halogenated alkyl quaternary ammonium salts, etc. These surfactants can be used alone or in combination of two types or more.

The above-mentioned emulsification can be performed by dispersion using a normal stirring device, however, a homomixer, homogenizer, disperser, line mixer, etc. can be used in order to obtain more uniform aqueous dispersion with finer particle size.

In a case where the above-mentioned chain extension reaction (increasing molecular weight) is performed, a chain extender (a3) other than water can be added if necessary to react the reaction product of the above-mentioned isocyanate group-containing urethane prepolymer (a2) and the secondary amino group- and alkoxysilyl group-containing compound (a1) with the chain extender (a3).

The above-mentioned urethane resin (A) particle aqueous dispersion preferably contains the above-mentioned chain extender (a3) as a component thereof, from the viewpoints of the abrasion resistance property, glass adhesion property, chipping resistance property, etc., of the coating film to be formed.

A known chain extender having active hydrogen can be used as the above-mentioned chain extender (a3). Specific examples include, for example, diamine compounds such as ethylenediamine, hexamethylenediamine, cyclohexanediamine, cyclohexylmethanediamine, isophoronediamine, etc., triamine compounds such as diethylenetriamine, etc., tetraamine compounds such as triethylenetetraamine, etc., aminoalcohol compounds such as hydroxyethylhydrazine, hydroxyethyldiethylenetriamine, N-(2-aminoethyl)ethanol, 1,3-diamino-2-propanol, 3-aminopropanediol, etc., and hydrazine, etc.

The above-mentioned chain extender (a3) preferably includes a diamine compound such as ethylenediamine, etc., from the viewpoint of storage stability, etc. of the coating composition to be obtained.

Furthermore, as the above-mentioned chain extender (a3), an amino alcohol compound such as N-(2-aminoethyl)ethanol, etc., can be used for the purpose of introducing a reactive functional group into the urethane resin (A) particle aqueous dispersion.

The urethane resin (A) synthesized in the above-mentioned production steps 1 to 4 is synthesized as a dispersion in an aqueous solvent and is in the form of particles.

Here, the aqueous solvent refers to a solvent whose main component is water (for example, a solvent in which 70 to 100 mass % of the solvent is water).

The average particle size of the above-mentioned urethane resin (A) particles is preferably within the range of 10 to 5,000 nm, more preferably within the range of 10 to 1,000 nm, particularly preferably within the range of 20 to 500 nm, and even more preferably within the range of 50 to 140 nm, from the viewpoint of storage stability of the aqueous coating composition to be obtained, etc.

The average particle size of the above-mentioned urethane resin (A) particles can be adjusted to a desired average particle size by adjusting particle size control factors such as the composition of the raw materials (polyisocyanate component, polyol component, amine component, etc.), the type of emulsifier, the amount of emulsifier, the distribution of the emulsifier in the feed, the type of neutralizing agent, the amount of neutralizing agent, etc.

In the present description, the average particle size of the urethane resin (A) particles is a value measured at 20° C. after diluting with deionized water in a conventional manner using a particle size distribution measuring device adopting the dynamic light scattering method. For example, an "ELSZ-2000" (product name, manufactured by OTSUKA ELECTRONICS CO., LTD) can be used as a particle size distribution measuring device adopting the dynamic light scattering method.

The hydroxyl value of the above-mentioned urethane resin (A) is preferably within the range of 0 to 45 mgKOH/g, more preferably within the range of 0 to 30 mgKOH/g, and even more preferably within the range of 0 to 25 mgKOH/g, from the viewpoints of the abrasion resistance property, chipping resistance property, glass adhesion property, etc., of the coating film to be formed.

The acid value of the above-mentioned urethane resin (A) is preferably within the range of 3 to 75 mgKOH/g, more preferably within the range of 5 to 60 mgKOH/g, and even more preferably within the range of 10 to 40 mgKOH/g, from the viewpoint of storage stability, etc., of the aqueous coating composition to be obtained.

The solid content concentration in the above-mentioned urethane resin (A) particle aqueous dispersion is preferably within the range of 20 to 50 mass %, and even more preferably within the range of 30 to 50 mass %. When the solid content concentration is 50 mass % or less, emulsification is easier and an aqueous dispersion can be easily obtained. When the solid content concentration is 20 mass % or more, the solvent component is reduced, and the solid content concentration of the aqueous coating composition can be increased.

Incidentally, in the present description, "solid" refers to non-volatile components such as resin, curing agent (B), pigment, etc., remaining after being dried at 110° C. for 1 hour. The above-mentioned solids can be determined by, for example, weighing a sample in a heat-resistant container such as an aluminum foil cup, etc., spreading the sample on the bottom of the container, drying the same at 110° C. for 1 hour, and weighing the mass of the components remaining after being dried.

In the present description, "solid content concentration" refers to the mass ratio of the above-mentioned solid content in the composition. Therefore, the solid content concentration of a composition can be calculated by weighing out 1.0 g of the composition in a heat-resistant container such as an aluminum foil cup, etc., spreading the composition on the bottom of the container, drying the same at 110° C. for 1 hour, weighing the mass of the components in the composition remaining after being dried, and obtaining the ratio of the mass of the components remaining after being dried to the total mass of the composition before being dried.

The content of the urethane resin (A) particles in the aqueous coating composition of the present invention is preferably within the range of 10 to 70 mass %, more preferably within the range of 15 to 60 mass %, and even more preferably within the range of 20 to 55 mass %, based on the total resin solid amount in the aqueous coating composition, from the viewpoints of the storage stability of the aqueous coating composition to be obtained, and the abrasion resistance property, chipping resistance property, glass adhesion property, etc., of the coating film to be formed.

[Curing Agent (B)]

A curing agent (B) is a compound that can react with the crosslinkable functional groups in the above-mentioned urethane resin (A) particle aqueous dispersion, and the acrylic resin (C) and polyester resin (D) as desired which will be described below to cure the aqueous coating composition. The curing agent (B) can be used alone or in combination of two or more.

The above-mentioned curing agent (B) includes, for example, polycarbodiimide compound, amino resin, polyisocyanate compound, blocked polyisocyanate compound, epoxy group-containing compound, carboxyl group-containing compound, hydrazide group-containing compound, semicarbazide group-containing compound, etc.

In particular, from the viewpoints of the storage stability of the aqueous coating composition to be obtained, and the abrasion resistance property, chipping resistance property, and glass adhesion property, etc., of the coating film to be formed, it is preferable to include at least one selected from polycarbodiimide compound (B1), amino resin (B2), polyisocyanate compound (B3), and blocked polyisocyanate compound (B4), more preferably to include at least one selected from polycarbodiimide compound (B1), amino resin (B2), and blocked polyisocyanate compound (B4), and it is even more preferable to include polycarbodiimide compound (B1).

The polycarbodiimide compound (B1) is a compound having at least two carbodiimide groups in one molecule, and for example, a compound obtained by subjecting the isocyanate groups of an isocyanate group-containing compound to a carbon dioxide removal reaction can be used.

As the above-mentioned polycarbodiimide compound (B1), it is preferable to use a water-soluble or water-dispersible polycarbodiimide compound from the viewpoints of the storage stability of the aqueous coating composition to be obtained, and the abrasion resistance property and glass adhesion property, etc., of the coating film to be formed. As the water-soluble or water-dispersible polycarbodiimide compound, any polycarbodiimide compound that can be stably dissolved or dispersed in an aqueous medium can be used without any particular limitation.

As the above-mentioned water-soluble polycarbodiimide compound, specifically, for example, "Carbodilite SV-02", "Carbodilite V-02", "Carbodilite V-02-L2", "Carbodilite V-04" (all of which are product names manufactured by Nisshinbo Holdings Inc.), etc. can be used. As the above-mentioned water-dispersible polycarbodiimide compound, for example, "Carbodilite E-01", "Carbodilite E-02", "Carbodilite E-05" (all of which are product names manufactured by Nisshinbo Holdings Inc.), etc. can be used.

In a case where the above-mentioned curing agent (B) includes a polycarbodiimide compound (B1), the content of the polycarbodiimide compound (B1) is preferably within the range of 10 to 80 mass %, more preferably within the range of 15 to 70 mass %, and even more preferably within the range of 20 to 65 mass %, based on the total solid amount of the curing agent (B), from the viewpoints of the abrasion resistance property and glass adhesion property, etc., of the coating film to be formed.

As the above-mentioned amino resin (B2), a partially methylolated amino resin or a completely methylolated amino resin obtained by the reaction of an amino component with an aldehyde component can be used. As the above-mentioned amino component, for example, melamine, urea, benzoguanamine, acetoguanamine, steroguanamine, spiroguanamine, dicyandiamide, etc., can be mentioned. The above-mentioned aldehyde components include formaldehyde, paraformaldehyde, acetaldehyde, benzaldehyde, etc.

Furthermore, the above-mentioned methylolated amino resins in which the methylol groups are partially or completely etherified with a suitable alcohol can be used. Examples of alcohols used for etherification include, for example, methyl alcohol, ethyl alcohol, n-propyl alcohol, isopropyl alcohol, n-butyl alcohol, isobutyl alcohol, 2-ethyl-1-butanol, 2-ethyl-1-hexanol, etc.

As the above-mentioned amino resin (B2), melamine resin is preferable. In particular, methyl etherified melamine resin obtained by partially or completely etherifying methylol groups of partially or completely methylolated melamine resin with methyl alcohol, butyl etherified melamine resin obtained by partially or completely etherifying methylol groups of partially or completely methylolated melamine resin with butyl alcohol, and methyl-butyl mixed etherified melamine resin obtained by partially or completely etherifying methylol groups of partially or completely methylolated melamine resin with methyl alcohol and butyl alcohol are preferable, and methyl-butyl mixed etherified melamine resin is more preferable.

The above-mentioned melamine resin preferably has a weight-average molecular weight of 400 to 6,000, more preferably 500 to 4,000, and even more preferably 600 to 3,000.

Commercially available melamine resins can be used. Commercially available product names include, for example, "Cymel 202", "Cymel 203", "Cymel 238", "Cymel 250", "Cymel 251", "Cymel 303", "Cymel 323", "Cymel 324", "Cymel 325", "Cymel 327", "Cymel 350", "Cymel 385", "Cymel 1156", "Cymel 1158", "Cymel 1116", "Cymel 1130" (all manufactured by Allnex Japan Inc.), "U-Ban 120", "U-Ban 20HS", "U-Ban 20SE602, "U-Ban 2021", "U-Ban 2028", "U-Ban 28-60" (all manufactured by Mitsui Chemicals, Inc.), etc.

In a case where the aqueous coating composition of the present invention contains the above-mentioned melamine resin, the aqueous coating composition may contain, as a curing catalyst, a sulfonic acid such as paratoluenesulfonic acid, dodecylbenzenesulfonic acid, dinonylnaphthalenesulfonic acid, etc.; a neutral salt of the aforementioned sulfonic acid with an amine; a neutral salt of a phosphoric acid ester compound with an amine, etc.

In a case where the above-mentioned curing agent (B) includes an amino resin (B2), the content of the amino resin (B2) is preferably within the range of 10 to 80 mass %, more preferably within the range of 15 to 70 mass %, and even more preferably within the range of 20 to 65 mass %, based on the total solid amount of the curing agent (B), from the viewpoints of the storage stability of the aqueous coating composition to be obtained and the abrasion resistance property and glass adhesion property, etc., of the coating film to be formed.

The above-mentioned polyisocyanate compound (B3) is a compound having at least two isocyanate groups in one molecule, and includes, for example, aliphatic polyisocyanate, alicyclic polyisocyanate, araliphatic polyisocyanate, aromatic polyisocyanate, derivatives of the aforementioned polyisocyanates, etc.

Above-mentioned aliphatic polyisocyanates include, for example, aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, methyl 2,6-diisocyanatohexanoate (common name: lysine diisocyanate), etc.; and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane, etc.

The above-mentioned alicyclic polyisocyanates include, for example, alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl) cyclohexane (common name: hydrogenated xylylene diisocyanate) or a mixture thereof, methylenebis(4,1-cyclohexanediyl)diisocyanate (common name: hydrogenated MDI), norbornane diisocyanate, etc.; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane, etc.

The above-mentioned araliphatic polyisocyanates include, for example, araliphatic diisocyanates such as methylenebis(4,1-phenylene)diisocyanate (common name: MDI), 1,3- or 1,4-xylylene diisocyanate or mixtures thereof, ω,ω'-diisocyanato-1,4-diethylbenzene, 1,3- or 1,4-bis(1-isocyanato-1-methylethyl)benzene (common name: tetramethylxylylene diisocyanate) or mixtures thereof, etc.; and araliphatic triisocyanates such as 1,3,5-triisocyanatomethylbenzene, etc.

The above-mentioned aromatic polyisocyanates include, for example, aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or a mixture thereof, 4,4'-toluidine diisocyanate, 4,4'-diphenyl ether diisocyanate, etc.; aromatic triisocyanates such as triphenylmethane-4,4',4"-triisocyanate, 1,3,5-triisocyanatobenzene, 2,4,6-triisocyanatotoluene, etc.; and aromatic tetraisocyanates such as 4,4'-diphenylmethane-2,2',5,5'-tetraisocyanate, etc.

Furthermore, the derivatives of the above-mentioned polyisocyanates include, for example, dimers, trimers, biurets, allophanates, uretdione, uretoimine, isocyanurates, oxadiazinetriones, polymethylene polyphenyl polyisocyanates (crude MDI, polymeric MDI), crude TDI, etc., of the above-mentioned polyisocyanates.

The above-mentioned polyisocyanates and their derivatives may be used alone or in combination of two or more types. Among these polyisocyanates, aliphatic diisocyanates, alicyclic diisocyanates, and the derivatives of the aforementioned are preferable.

The above-mentioned polyisocyanate compound may be a prepolymer obtained by reacting the above-mentioned polyisocyanate or the derivative thereof with a compound that can react with the polyisocyanate under conditions of an excess of isocyanate group. Examples of the compound that can react with the polyisocyanate include, for example, compounds having active hydrogen groups such as hydroxyl groups, amino groups, etc., and specifically, for example, polyhydric alcohols, low molecular weight polyester resins, amines, water, etc. can be used.

In a case where the above-mentioned curing agent (B) includes a polyisocyanate compound (B3), the content of the polyisocyanate compound (B3) is preferably within the range of 10 to 80 mass %, more preferably within the range of 15 to 70 mass %, and even more preferably within the range of 20 to 65 mass %, based on the total solid amount of the curing agent (B), from the viewpoints of the storage stability of the aqueous coating composition to be obtained, and the abrasion resistance property and glass adhesion property, etc., of the coating film to be formed.

In addition, as the above-mentioned polyisocyanate compound, a polymer of an isocyanate group-containing polymerizable unsaturated monomer, or a copolymer of the isocyanate group-containing polymerizable unsaturated monomer and a polymerizable unsaturated monomer other than the isocyanate group-containing polymerizable unsaturated monomer may be used.

The above-mentioned blocked polyisocyanate compound (B4) is a compound in which the isocyanate groups of the above-mentioned polyisocyanate compound (B3) are blocked with a blocking agent.

The above-mentioned blocking agents include, for example, phenol-based agents such as phenol, cresol, xylenol, nitrophenol, ethylphenol, hydroxydiphenyl, butylphenol, isopropylphenol, nonylphenol, octylphenol, methyl hydroxybenzoate, etc.; lactam-based agents such as ε-caprolactam, δ-valerolactam, γ-butyrolactam, β-propiolactam, etc.; aliphatic alcohol-based agents such as methanol, ethanol, propyl alcohol, butyl alcohol, amyl alcohol, lauryl alcohol, etc.; ether-based agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, etc.; alcohol-based agents such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, 2-hydroxyethyl methacrylate, etc.; oxime-based agents such as formamide oxime, acetamide oxime, acetoxime, methyl ethyl ketoxime, diacetyl monooxime, benzophenone oxime, cyclohexane oxime, etc.; active methylene-based agents such as dimethyl malonate, diethyl malonate, ethyl acetoacetate, methyl acetoacetate, acetylacetone, etc.; mercaptan-based agents such as butyl mercaptan, t-butyl mercaptan, hexyl mercaptan, t-dodecyl mercaptan, 2-mercaptobenzothiazole, thiophenol, methyl thiophenol, ethyl thiophenol, etc.; acid amide-based agents such as acetanilide, acetaniside, acetotoluide, acrylamide, methacrylamide, acetate amide, stearic acid amide, benzamide, etc.; imide-based agents such as succinimide, phthalic acid imide, maleic acid imide, etc.; amine-based agents such as diphenylamine, phenylnaphthylamine, xylidine, N-phenylxylidine, carbazole, aniline, naphthylamine, butylamine, dibutylamine, butylphenylamine, etc.; imidazole-based agents such as imidazole, 2-ethylimidazole, etc.; urea-based agents such as urea, thiourea, ethyleneurea, ethylenethiourea, diphenylurea, etc.; carbamate ester-based agents such as N-phenylphenylcarbamate, etc.; imine-based agents such as ethyleneimine, propyleneimine, etc.; sulfite-based agents such as sodium bisulfite, potassium bisulfite, etc.; and azole-based agents, etc. Examples of the above-mentioned azole-based agents include pyrazole or pyrazole derivatives such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole, etc.; imidazole or imidazole derivatives such as imidazole, benzimidazole, 2-methylimidazole, 2-ethylimidazole, 2-phenylimidazole, etc.; imidazoline derivatives such as 2-methylimidazoline, 2-phenylimidazoline, etc.

Among the aforementioned, preferable blocking agents include active methylene-based blocking agents, pyrazoles, or pyrazole derivatives.

When blocking (reacting with a blocking agent), a solvent can be added if necessary. Solvents used in the blocking reaction are preferably those that are not reactive with the isocyanate group, and may include, for example, ketones such as acetone and methyl ethyl ketone, esters such as ethyl acetate, and solvents such as N-methyl-2-pyrrolidone (NMP).

In addition, hydroxycarboxylic acids having one or more hydroxyl groups and one or more carboxyl groups, for example, hydroxypivalic acid, dimethylolpropionic acid, etc., can also be used as the above-mentioned blocking agents. In particular, blocked polyisocyanate compounds obtained by blocking the isocyanate group with the above-mentioned hydroxycarboxylic acids and then neutralizing the carboxyl groups of the hydroxycarboxylic acids to impart water dispersibility can be preferably used.

In a case where the above-mentioned curing agent (B) includes a blocked polyisocyanate compound (B4), the content of the blocked polyisocyanate compound (B4) is preferably within the range of 10 to 80 mass %, more preferably within the range of 15 to 70 mass %, and even more preferably within the range of 20 to 65 mass %, based on the total solid amount of the curing agent (B), from the viewpoints of the storage stability of the aqueous coating composition to be obtained, and the abrasion resistance property and glass adhesion property, etc., of the coating film to be formed.

The above-mentioned curing agent (B) can be used alone or in combination of two or more types.

The content of the above-mentioned curing agent (B) in the aqueous coating composition of the present invention is within the range of 5 to 50 mass %, based on the total resin solid amount in the aqueous coating composition. By setting the content of the curing agent (B) within the range of 5 to 50 mass %, it is possible to form a coating film having excellent abrasion resistance, glass adhesion property and chipping resistance.

The content of the above-mentioned curing agent (B) is preferably within the range of 7 to 50 mass %, more preferably within the range of 10 to 40 mass %, and even more preferably within the range of 10 to 30 mass %, based on the total resin solid amount in the aqueous coating composition, from the viewpoint of the abrasion resistance property and glass adhesion property, etc., of the coating film to be formed.

The aqueous coating composition of the present invention may further contain at least one resin selected from acrylic resin (C) and polyester resin (D), if necessary.

[Acrylic Resin (C)]

As the acrylic resin (C), a water-soluble or water-dispersible acrylic resin known per se that has been conventionally used in water-based coatings can be used.

Acrylic resin (C) preferably has a crosslinkable functional group that can react with the above-mentioned curing agent (B). Examples of the crosslinkable functional group include, for example, a hydroxyl group, a carboxyl group, an alkoxysilyl group, etc.

The acrylic resin (C) can be produced by copolymerizing a polymerizable unsaturated monomer by a method known per se, for example, a solution polymerization method in an organic solvent, an emulsion polymerization method in water, etc.

As the above-mentioned polymerizable unsaturated monomers, for example, the following monomers (i) to (xxi), etc. can be used. These polymerizable unsaturated monomers can be used alone or in combination of two or more types.

(i) Alkyl or cycloalkyl (meth)acrylate: for example, methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.

(ii) Polymerizable unsaturated monomers having an isobornyl group: isobornyl(meth)acrylate, etc.

(iii) Polymerizable unsaturated monomers having an adamantyl group: adamantyl(meth)acrylate, etc.

(iv) Polymerizable unsaturated monomers having a tricyclodecenyl group: tricyclodecenyl(meth)acrylate, etc.

(v) Polymerizable unsaturated monomers having an aromatic ring: benzyl(meth)acrylate, styrene, α-methylstyrene, vinyltoluene, etc.

(vi) Polymerizable unsaturated monomers having an alkoxysilyl group: vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, etc.

(vii) Polymerizable unsaturated monomers having a fluorinated alkyl group: perfluoroalkyl (meth)acrylates such as perfluorobutylethyl (meth)acrylate, perfluorooctylethyl (meth)acrylate, etc.; fluoroolefins, etc.

(viii) Polymerizable unsaturated monomers having a photopolymerizable functional group such as a maleimide group, etc.

(ix) Vinyl compounds: N-vinylpyrrolidone, ethylene, butadiene, chloroprene, vinyl propionate, vinyl acetate, etc.

(x) Carboxylic group-containing polymerizable unsaturated monomers: (meth)acrylic acid, maleic acid, crotonic acid, β-carboxyethyl (meth)acrylate, etc.

(xi) Nitrogen-containing polymerizable unsaturated monomers: (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylene bis(meth)acrylamide, ethylene bis(meth) acrylamide, adduct of glycidyl (meth)acrylate and amine compound, etc.

(xii) Polymerizable unsaturated monomers having two or more polymerizable unsaturated groups in one molecule: allyl (meth)acrylate, ethylene glycol di(meth)acrylate, 1,4-butanediol di(meth)acrylate, neopentyl glycol di(meth)acrylate, 1,6-hexanediol di(meth)acrylate, etc.

(xiii) Epoxy group-containing polymerizable unsaturated monomers: glycidyl (meth)acrylate, (3-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xiv) (Meth)acrylate having a polyoxyethylene chain with an alkoxy group at the molecular terminal (xv) Polymerizable unsaturated monomers having a sulfonic acid group: 2-acrylamido-2-methylpropanesulfonic acid, 2-sulfoethyl (meth)acrylate, allylsulfonic acid, 4-styrenesulfonic acid, etc.; sodium salts and ammonium salts of the aforementioned sulfonic acids, etc.

(xvi) Polymerizable unsaturated monomers having a phosphoric acid group: acid phosphooxyethyl (meth)acrylate, acid phosphooxypropyl (meth)acrylate, acid phosphooxypoly(oxyethylene)glycol (meth)acrylate, acid phosphooxypoly(oxypropylene)glycol (meth)acrylate, etc.

(xvii) Polymerizable unsaturated monomers having an ultraviolet absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, 2-[2-hydroxy-5-[2-(methacryloyloxy)ethyl]phenyl]-2H-benzotriazole, etc.

(xviii) Light-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2, 6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.

(xix) Polymerizable unsaturated monomers having a carbonyl group: acrolein, diacetone acrylamide, diacetone methacrylamide, acetoacetoxyethyl methacrylate, formylstyrol, vinyl alkyl ketones having 4 to 7 carbon atoms (for example, vinyl methyl ketone, vinyl ethyl ketone, vinyl butyl ketone), etc.

(xx) Polymerizable unsaturated monomers having an acid anhydride group: maleic anhydride, itaconic anhydride, citraconic anhydride, etc.

(xxi) Hydroxyl group-containing polymerizable unsaturated monomers: monoesters of (meth)acrylic acid and dihydric alcohols having 2 to 8 carbon atoms such as 2-hydroxyethyl (meth)acrylate, 2-hydroxypropyl (meth)acrylate, 3-hydroxypropyl (meth)acrylate, 4-hydroxybutyl (meth) acrylate, etc.; s-caprolactone-modified monoesters of the aforementioned (meth)acrylic acid and dihydric alcohols having 2 to 8 carbon atoms; N-hydroxymethyl (meth)acrylamide; allyl alcohol, and (meth)acrylates having polyoxyethylene chains with hydroxyl groups at the molecular terminals, etc. It should be noted that, monomers falling under the above-mentioned "(xvii) Polymerizable unsaturated monomers having an ultraviolet absorbing functional group" are excluded from the above-mentioned "Hydroxyl group-containing polymerizable unsaturated monomers" even if they are monomers having hydroxyl groups.

In a case where the above-mentioned acrylic resin (C) includes the above-mentioned hydroxyl group-containing polymerizable unsaturated monomer as a component of the acrylic resin (C), the use ratio of the hydroxyl group-containing polymerizable unsaturated monomer used is preferably within the range of 1 to 50 mass %, more preferably within the range of 2 to 40 mass %, and even more preferably within the range of 3 to 30 mass %, based on the total amount of the monomer components.

In a case where the above-mentioned acrylic resin (C) includes the above-mentioned carboxyl group-containing polymerizable unsaturated monomer as a component of the acrylic resin (C), the use ratio of the carboxyl group-containing polymerizable unsaturated monomer is preferably within the range of 1 to 50 mass %, more preferably within the range of 1.5 to 40 mass %, and even more preferably within the range of 2 to 30 mass %, based on the total amount of the monomer components.

In a case where the above-mentioned acrylic resin (C) includes the above-mentioned alkoxysilyl group-containing polymerizable unsaturated monomer as a component of the acrylic resin (C), the use ratio of the alkoxysilyl group-containing polymerizable unsaturated monomer is preferably within the range of 1 to 70 mass %, more preferably within the range of 1.5 to 60 mass %, and even more preferably within the range of 2 to 40 mass %, based on the total amount of the monomer components.

The above-mentioned acrylic resin (C) preferably has a hydroxyl value in the range of 1 to 200 mgKOH/g, more preferably in the range of 2 to 180 mgKOH/g, and even more preferably in the range of 5 to 150 mgKOH/g, from the viewpoints of the curability, abrasion resistance property, chipping resistance property, and glass adhesion property, etc., of the coating film to be formed.

Furthermore, the acid value of the above-mentioned acrylic resin (C) is preferably within the range of 1 to 150 mgKOH/g, more preferably within the range of 5 to 100 mgKOH/g, and even more preferably within the range of 5 to 80 mgKOH/g, from the viewpoint of storage stability, etc., of the aqueous coating composition to be obtained.

In a case where the aqueous coating composition of the present invention contains the above-mentioned acrylic resin (C), the content of the acrylic resin (C) is preferably within the range of 2 to 70 mass %, more preferably within the range of 5 to 60 mass %, and even more preferably within the range of 10 to 50 mass %, based on the total resin solid amount in the aqueous coating composition.

[Polyester Resin (D)]

As polyester resin (D), a water-soluble or water-dispersible polyester resin known per se that has been conventionally used in water-based coatings can be used.

Polyester resin (D) preferably has a crosslinkable functional group that can react with the above-mentioned curing agent (B). Examples of the crosslinkable functional group include, for example, a hydroxyl group, a carboxyl group, etc.

The polyester resin (D) can usually be produced by an esterification reaction or an ester exchange reaction of an acid component and an alcohol component.

As the above-mentioned acid component, a compound that is usually used as an acid component in the production of polyester resin can be used. Examples of such acid components include, for example, aliphatic polybasic acids, alicyclic polybasic acids, aromatic polybasic acids, etc.

The above-mentioned aliphatic polybasic acids are generally aliphatic compounds having two or more carboxyl groups in one molecule, acid anhydrides of the aliphatic compounds, and esters of the aliphatic compounds. Examples of the aliphatic polybasic acids include, for example, aliphatic polycarboxylic acids such as succinic acid, glutaric acid, adipic acid, pimelic acid, suberic acid, azelaic acid, sebacic acid, undecane diacid, dodecane diacid, brassylic acid, octadecanedioic acid, citric acid, butanetetracarboxylic acid, etc.; anhydrides of the aliphatic polycarboxylic acids; esters of the aliphatic polycarboxylic acids with lower alkyls having approximately 1 to 4 carbon atoms, etc. The above-mentioned aliphatic polybasic acids can be used alone or in combination of two or more types.

As the above-mentioned aliphatic polybasic acid, it is preferable to use adipic acid and/or adipic anhydride, from the viewpoint of the chipping resistance property, etc., of the coating film to be formed.

The above-mentioned alicyclic polybasic acids are generally compounds having one or more alicyclic structures and two or more carboxyl groups in one molecule, acid anhydrides of such compounds, and esters of such compounds. The alicyclic structures are mainly 4- to 6-membered ring structures. Examples of alicyclic polybasic acids include, for example, alicyclic polycarboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, etc.; anhydrides of the alicyclic polycarboxylic acids; esters of the alicyclic polycarboxylic acids with lower alkyls having approximately 1 to 4 carbon atoms, etc. The above-mentioned alicyclic polybasic acids can be used alone or in combination of two or more types.

As the above-mentioned alicyclic polybasic acids, from the viewpoint of chipping resistance property, etc., of the coating film to be formed, it is preferable to use 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride, and among the aforementioned, it is more preferable to use 1,2-cyclohexanedicarboxylic acid and/or 1,2-cyclohexanedicarboxylic anhydride.

The above-mentioned aromatic polybasic acids are generally aromatic compounds having two or more carboxyl groups in one molecule, acid anhydrides of the aromatic compounds, and esters of the aromatic compounds, and examples of the aromatic polybasic acids include, for example, aromatic polycarboxylic acids such as phthalic acid, isophthalic acid, terephthalic acid, naphthalenedicarboxylic acid, 4,4'-biphenyldicarboxylic acid, trimellitic acid, pyromellitic acid, etc.; anhydrides of the aromatic polycarboxylic acids; esters of the aromatic polycarboxylic acids with lower alkyls having 1 to 4 carbon atoms, etc. The above-mentioned aromatic polybasic acids can be used alone or in combination of two or more types.

As the above-mentioned aromatic polybasic acids, it is preferable to use phthalic acid, phthalic anhydride, isophthalic acid, trimellitic acid, or trimellitic anhydride.

In addition, acid components other than the above-mentioned aliphatic polybasic acids, alicyclic polybasic acids, and aromatic polybasic acids can also be used. Such acid components are not particularly limited, and examples thereof include, for example, fatty acids such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, etc.; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, 10-phenyloctadecanoic acid, etc.; hydroxycarboxylic acids such as lactic acid, 3-hydroxybutanoic acid, 3-hydroxy-4-ethoxybenzoic acid, etc. These acid components can be used alone or in combination of two or more types.

As the above-mentioned alcohol component, a polyhydric alcohol having two or more hydroxyl groups in one molecule can be preferably used. Examples of the polyhydric alcohol include, for example, dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecane dimethanol, hydroxypivalic acid neopentyl glycol ester, hydrogenated bisphenol A, hydrogenated bisphenol F, dimethylolpropionic acid, etc.; polylactone diols obtained by adding lactone compounds such as ε-caprolactone to these dihydric alcohols; ester diol compounds such as bis(hydroxyethyl) terephthalate; polyether diol compounds such as alkylene oxide adducts of bisphenol A, polyethylene glycol, polypropylene glycol, polybutylene glycol, polytetramethylene ether glycol, etc.; trihydric or higher alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol, mannit, etc.; polylactone polyol compounds obtained by adding lactone compounds such as ε-caprolactone to these trihydric or higher alcohols; fatty acid esters of glycerin, etc.

Alcohol components other than the above-mentioned polyhydric alcohols can also be used. Such alcohol components are not particularly limited, and include, for example, monoalcohols such as methanol, ethanol, propyl alcohol, butyl alcohol, stearyl alcohol, 2-phenoxyethanol, etc.; alcohol compounds obtained by reacting monoepoxy compounds such as propylene oxide, butylene oxide, "Cardura E10P" (product name, manufactured by HEXION INC., glycidyl ester of synthetic highly branched saturated fatty acid), etc. with acids, etc.

The method of producing polyester resin is not particularly limited, and can be carried out according to a normal method. For example, the above-mentioned acid component and alcohol component are heated in a nitrogen gas flow at approximately 150 to 250° C. for approximately 5 to 10 hours, and the acid component and the alcohol component are subjected to esterification reaction or an ester exchange reaction, whereby the polyester resin can be produced.

When the above-mentioned acid component and alcohol component are subjected to an esterification reaction or an ester exchange reaction, they may be added to a reaction vessel at once, or one or both may be added in several portions. Alternatively, a hydroxyl group-containing polyester resin may be first synthesized, and then the obtained hydroxyl group-containing polyester resin may be reacted with an acid anhydride to perform half esterification to obtain a carboxyl group-containing polyester resin. Alternatively, a carboxyl group-containing polyester resin may be first synthesized, and then the above-mentioned alcohol component may be added to obtain a hydroxyl group-containing polyester resin.

When the above-mentioned esterification or ester exchange reaction is performed, a catalyst known per se, such as dibutyltin oxide, antimony trioxide, zinc acetate, manganese acetate, cobalt acetate, calcium acetate, lead acetate, tetrabutyl titanate, tetraisopropyl titanate, etc., may be used as a catalyst for promoting the reaction.

The above-mentioned polyester resin can be modified during or after the preparation of the resin with fatty acids, monoepoxy compounds, polyisocyanate compounds, acrylic resins, etc. The above-mentioned fatty acids include, for example, coconut oil fatty acids, cottonseed oil fatty acids, hempseed oil fatty acids, rice bran oil fatty acids, fish oil fatty acids, tall oil fatty acids, soybean oil fatty acids, linseed oil fatty acids, tung oil fatty acids, rapeseed oil fatty acids, castor oil fatty acids, dehydrated castor oil fatty acids, safflower oil fatty acids, etc., and as the above-mentioned monoepoxy compound, for example, "Cardura E10P" (product name, manufactured by HEXION INC., glycidyl ester of synthetic highly branched saturated fatty acid) can be preferably used.

The above-mentioned polyisocyanate compounds include, for example, organic polyisocyanates themselves exemplified as aliphatic diisocyanate compounds such as lysine diisocyanate, hexamethylene diisocyanate, trimethylhexane diisocyanate, etc.; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate), 1,3-(isocyanatomethyl)cyclohexane, etc.; aromatic diisocyanate compounds such as tolylene diisocyanate, xylylene diisocyanate, diphenylmethane diisocyanate, etc.; trivalent or higher polyisocyanates such as lysine triisocyanate, etc.; adducts of these organic polyisocyanates with polyhydric alcohols, low molecular weight polyester resins, water, etc.; cyclic polymers of these organic polyisocyanates (for example, isocyanurates), biuret-type adducts, etc. These polyisocyanate compounds can be used alone or in combination of two or more types.

In addition, known methods can be used to modify the above-mentioned polyester resin to acrylic resin, such as a method of polymerizing a mixture of a polymerizable unsaturated group-containing polyester resin and a polymerizable unsaturated monomer, a method of reacting polyester resin with acrylic resin, etc.

The hydroxyl value of the above-mentioned polyester resin (D) is preferably within the range of 1 to 250 mgKOH/g, more preferably within the range of 2 to 200 mgKOH/g, and even more preferably within the range of 5 to 180 mgKOH/g.

The acid value of the above-mentioned polyester resin (D) is preferably within the range of 1 to 150 mgKOH/g, more preferably within the range of 2 to 100 mgKOH/g, and even more preferably within the range of 2 to 80 mgKOH/g.

The number average molecular weight of the above-mentioned polyester resin (D) is preferably within the range of 500 to 50,000, more preferably within the range of 800 to 30,000, and even more preferably within the range of 1,000 to 10,000.

In a case where the aqueous coating composition of the present invention contains the above-mentioned polyester resin (D), the content of the polyester resin (D) is preferably within the range of 2 to 70 mass %, more preferably within the range of 5 to 50 mass %, and even more preferably within the range of 10 to 40 mass %, based on the total resin solid amount in the aqueous coating composition.

[Other Components]

The aqueous coating composition of the present invention may further contain, if necessary, resins, other than the urethane resin (A) particle aqueous dispersion, the curing agent (B), the acrylic resin (C) and the polyester resin (D), pigments, organic solvents, curing catalysts, dispersants, anti-settling agents, defoamers, thickeners, UV absorbers, light stabilizers, surface conditioners, etc.

The above-mentioned resins other than urethane resin (A) particle aqueous dispersion, curing agent (B), acrylic resin (C) and polyester resin (D) include, for example, polyurethane resins other than the urethane resin (A) particle aqueous dispersion, acrylic-modified urethane resins other than the urethane resin (A) particle aqueous dispersion, polyester-modified urethane resins other than the urethane resin (A) particle aqueous dispersion, polyolefin resins, epoxy resins, etc.

The above-mentioned pigments include, for example, coloring pigments, extender pigments, luminous pigments, etc. The pigments can be used alone or in combination of two or more types. In a case where the aqueous coating composition of the present invention contains the above-mentioned pigments, the blending amount of the pigment is preferably within the range of 0.1 to 200 parts by mass, more preferably within the range of 1 to 150 parts by mass, and even more preferably within the range of 3 to 120 parts by mass, based on 100 parts by mass of the total resin solid content in the aqueous coating composition.

The above-mentioned coloring pigments include, for example, titanium oxide, zinc oxide, carbon black, molybdenum red, Prussian blue, cobalt blue, azo-based pigments, phthalocyanine-based pigments, quinacridone pigments, isoindoline-based pigments, threne-based pigments, perylene-based pigments, dioxazine-based pigments, diketopyrrolopyrrole-based pigments, etc. Among the aforementioned, titanium oxide and carbon black can be preferably used.

In a case where the aqueous coating composition of the present invention contains the above-mentioned coloring pigments, the blending amount of the coloring pigment is preferably within the range of 1 to 180 parts by mass, more preferably within the range of 5 to 150 parts by mass, and even more preferably within the range of 15 to 120 parts by mass, based on 100 parts by mass of the total resin solid content in the aqueous coating composition.

The above-mentioned extender pigments include, for example, barium sulfate, talc, clay, kaolin, barium carbonate, calcium carbonate, silica, alumina white, etc. As the extender pigments, barium sulfate and talc are preferably used from the viewpoint of coating stability and finishing property.

In a case where the aqueous coating composition of the present invention contains the above-mentioned extender pigments, the amount of the extender pigment is preferably within the range of 1 to 180 parts by mass, more preferably within the range of 5 to 140 parts by mass, and even more preferably within the range of 10 to 120 parts by mass, based on 100 parts by mass of the total resin solid content in the aqueous coating composition.

Furthermore, the above-mentioned luminous pigments include, for example, aluminum (including evaporated aluminum), copper, zinc, brass, nickel, glass flakes, aluminum oxide, mica, aluminum oxide coated with titanium oxide and/or iron oxide, mica coated with titanium oxide and/or iron oxide, etc. Among the aforementioned, it is preferable to use aluminum pigment. There are non-leafing type aluminum pigment and leafing type aluminum pigment in the aluminum pigments, and either one can be used.

The above-mentioned luminous pigment is preferably scaly. In addition, the luminous pigment is preferably the one having a longitudinal dimension within the range of 1 to 100 μm, particularly 5 to 40 μm, and a thickness within the range of 0.001 to 5 μm, particularly 0.01 to 2 μm.

In a case where the aqueous coating composition of the present invention contains the above-mentioned luminous pigment, the amount of the luminous pigment is preferably within the range of 0.1 to 100 parts by mass, more preferably within the range of 1 to 50 parts by mass, and even more preferably within the range of 3 to 25 parts by mass, based on 100 parts by mass of the total resin solid content in the aqueous coating composition.

The above-mentioned organic solvents include, for example, ketone-based solvents such as acetone, methyl ethyl ketone, methyl isobutyl ketone, etc.; ester-based solvents such as ethyl acetate, butyl acetate, methyl benzoate, ethyl ethoxypropionate, ethyl propionate, methyl propionate, etc.; alcohol-based solvents such as isopropanol, n-butanol, isobutanol, 2-ethylhexanol, etc.; ether-based solvents such as tetrahydrofuran, dioxane, dimethoxyethane, etc.; glycol ether-based solvents such as ethylene glycol monomethyl ether, ethylene glycol monoethyl ether, diethylene glycol monomethyl ether, propylene glycol monomethyl ether acetate, 3-methoxybutyl acetate, etc.; aromatic hydrocarbon-based solvents, aliphatic hydrocarbon-based solvents, etc.

The aqueous coating composition of the present invention can be applied by diluting the same with water and/or organic solvents, etc., if necessary and adjusting the viscosity to an appropriate level.

The appropriate viscosity varies depending on the coating composition, however, for example, the viscosity measured with a B-type viscometer at 60 rpm after 1 minute at a temperature of 20° C. (sometimes referred to as the "B60 value" in this description) is preferably within the range of 100 to 3,000 mPa·s, more preferably within the range of 300 to 2,000 mPa·s, and even more preferably within the range of 500 to 1,500 mPa·s, from the viewpoint of the appearance of the coating film to be formed, etc. The viscometer used in this case is "LVDV-I" (product name, manufactured by BROOKFIELD, B-type viscometer).

Furthermore, in the above-mentioned, the coating solid content concentration of the aqueous coating composition of the present invention is usually approximately 5 to 70 mass %, preferably approximately 10 to 55 mass %.

Furthermore, the gel fraction of the coating film to be formed from the aqueous coating composition of the present invention is preferably 85% or more, more preferably 87% or more, and even more preferably 90% or more, from the viewpoint of the abrasion resistance property, chipping resistance property, glass adhesion property, etc., of the coating film to be formed.

In this description, the gel fraction is measured by the following method.

First, the aqueous coating composition of the present invention is applied to a polypropylene plate for measuring the gel fraction to a thickness of 30 μm, and heated at 80° C. for 20 minutes in order to form a cured coating film. Next, the formed cured coating film is peeled off from the polypropylene plate and placed in a 300-mesh stainless steel mesh container whose mass (W1) has been measured in advance, and the total mass (W2) of the cured coating film and the mesh container is measured. The mesh container containing the cured coating film is placed in an equal mass mixed solvent of acetone and methanol, etc., heated to 50° C., and extraction is performed for 5 hours. After drying the same at 110° C. for 60 minutes, the total mass (W3) of the remaining cured coating film and mesh container is measured, and the remaining insoluble coating film rate (mass %) obtained according to the following formula is taken as the gel fraction.

$$\text{Gel fraction (mass \%)} = (W3 - W1)/(W2 - W1) \times 100$$

The aqueous coating composition of the present invention may be either a one-component coating or a multi-component coating, but it is preferable to use a one-component coating since the same does not require a coating mixing process, is highly productive, and can simplify maintenance of coating machines.

[Coating Film Forming Method]

In a case where a color coating film is formed on an object to be coated, the aqueous coating composition of the present invention can be used as an aqueous coating composition for the color coating film. The coating film forming method in this case can be performed according to, for example, the following method I.

<Method I>

A coating film forming method comprising steps of:

a step (I-1) of forming an uncured color coating film by applying an aqueous coating composition on an object to be coated; and a step (I-2) of thermal curing the uncured color coating film which has been formed in the step (I-1).

The above-mentioned objects to be coated include, for example, the outer panel portion and inner panel portion of automobile bodies such as passenger cars, trucks, motorcycles, buses, etc.; automobile parts; the outer panel portion of household electrical appliances such as mobile phones, audio equipment, etc. Among the aforementioned, the outer panel portion and inner panel portion of automobile bodies and automobile parts are preferable.

The materials of these objects to be coated are not particularly limited. For example, metal materials such as iron, aluminum, brass, copper, tinplate, stainless steel, zinc-plated steel, zinc alloy (Zn—Al, Zn—Ni, Zn—Fe, etc.) plated steel, etc.; resins such as polyethylene resin, polypropylene resin, acrylonitrile-butadiene-styrene (ABS) resin, polyamide resin, acrylic resin, vinylidene chloride resin, polycarbonate resin, polyurethane resin, epoxy resin, etc.; plastic materials such as various FRP, etc.; inorganic materials such as glass, cement, concrete, etc.; wood; fiber materials such as paper, cloth, etc., can be mentioned. Among the aforementioned, metal materials and plastic materials are preferable.

Furthermore, the surfaces of the objects to which the coating film is applied include automobile body exterior panel portion and interior panel portion, automobile parts, household electrical appliances, and metal surfaces of metal substrates such as steel plates, etc., that make up the aforementioned products, etc., that have been subjected to surface treatments such as phosphate treatment, chromate treatment, complex oxide treatment, etc.

A coating film may be formed on the object, which may or may not be surface-treated. For example, the object to be coated which is a substrate, may be surface-treated if necessary, and a primer coating film may be formed thereon. For example, in a case where the object to be coated is an automobile body, the primer coating film may be formed by using a known primer coating per se that is normally used in the coating of automobile bodies.

As a primer coating for forming the primer coating film, for example, an electrodeposition coating material, preferably a cationic electrodeposition coating material, may be used.

In a case where the above-mentioned object to be coated is the one where a primer coating film has been formed, an intermediate coating film may be additionally formed thereon. For example, in a case where the object to be coated is an automobile body, the intermediate coating film may be formed by using a known intermediate coating per se that is normally used in the coating of automobile bodies. The intermediate coating film may or may not be thermally cured.

The above-mentioned aqueous coating composition can be applied to the object to be coated by a method known per se, for example, air spray coating, airless spray coating, rotary atomization coating, curtain coat coating, etc., and electrostatic application may be performed during coating. Among the aforementioned, air spray coating and rotary atomization coating are preferable. Furthermore, such coating methods can be performed once or several times until the desired film thickness is obtained.

The amount of application of the above-mentioned aqueous coating composition is preferably an amount that results in a cured film thickness of the color coating film to be formed of 5 to 40 μm, more preferably an amount that results in a cured film thickness of 7 to 35 μm, and even more preferably an amount that results in a cured film thickness of 10 to 30 μm.

The above-mentioned heating can be performed by known means, and for example, drying ovens such as hot air ovens, electric ovens, infrared induction heating ovens, etc., can be used. The heating temperature is preferably within the range of 60 to 150° C., more preferably within the range of 70 to 120° C., and even more preferably within the range of 75 to 100° C. The heating time is not particularly limited, however, is preferably within the range of 10 to 90 minutes, and even more preferably within the range of 20 to 60 minutes.

[Multilayer Coating Film Forming Method]

The aqueous coating composition of the present invention can be used for forming an intermediate coating film and/or a basecoat coating film, in a case where a multilayer coating film consisting of an intermediate coating film, a basecoat coating film and a clear-coat coating film on an object to be coated such as an automobile body, etc., by the three-coat one-bake method.

The aqueous coating composition of the present invention can form the multilayer coating film according to, for example, the following method II.

<Method II>

A multilayer coating film forming method comprising steps of:

a step (II-1) of forming an uncured intermediate coating film by applying an intermediate coating composition on an object to be coated;

a step (II-2) of forming an uncured basecoat coating film by applying a basecoat coating composition on the uncured intermediate coating film which has been formed in the step (II-1);

a step (II-3) of forming an uncured clear-coat coating film by applying a clear-coat coating composition on the uncured basecoat coating film which has been formed in the step (II-2); and a step (II-4) of thermal curing the uncured intermediate coating film which has been formed in the step (II-1), the uncured basecoat coating film which has been formed in the step (II-2), and the uncured clear-coat coating film which has been formed in the step (II-3), at once, wherein at least one of the intermediate coating composition and the basecoat coating composition is the aqueous coating composition according to the present invention.

The Method II includes the following Method IIa, Method IIb, and Method IIc.

The multilayer coating film can be formed according to, for example, the following method IIa, in a case where the aqueous coating composition of the present invention is used for the above-mentioned intermediate coating film.

<Method IIa>

A multilayer coating film forming method comprising steps of:

a step (IIa-1) of forming an uncured intermediate coating film by applying the aqueous coating composition of the present invention as an intermediate coating composition on an object to be coated;

a step (IIa-2) of forming an uncured basecoat coating film by applying a basecoat coating composition on the uncured intermediate coating film which has been formed in the above-mentioned step (IIa-1);

a step (IIa-3) of forming an uncured clear-coat coating film by applying a clear-coat coating composition on the uncured basecoat coating film which has been formed in the above-mentioned step (IIa-2); and a step (IIa-4) of thermal curing the uncured intermediate coating film which has been formed in the above-mentioned step (IIa-1), the uncured basecoat coating film which has been formed in the above-mentioned step (IIa-2), and the uncured clear-coat coating film which has been formed in the above-mentioned step (IIa-3), at once.

As the above-mentioned object to be coated, the above-mentioned object to be coated exemplified in Method I can be used.

Furthermore, the surfaces of the objects to which the coating film is applied include automobile body exterior panel portion and interior panel portion, automobile parts, household electrical appliances, and metal surfaces of metal substrates such as steel plates, etc., that make up the aforementioned products, etc., that have been subjected to surface treatments such as phosphate treatment, chromate treatment, complex oxide treatment, etc.

A coating film may be formed on the object, which may or may not be surface-treated. For example, the object to be coated which is a substrate, may be surface-treated if necessary, and a primer coating film may be formed thereon. For example, in a case where the object to be coated is an automobile body, the primer coating film may be formed by using a known primer coating per se that is normally used in the coating of automobile bodies.

As a primer coating for forming the primer coating film, for example, an electrodeposition coating material, preferably a cationic electrodeposition coating material, may be used.

The above-mentioned aqueous coating composition can be applied to the object to be coated by a method known per se, for example, air spray coating, airless spray coating, rotary atomization coating, curtain coat coating, etc., and electrostatic application may be performed during coating. Among the aforementioned, air spray coating and rotary atomization coating are preferable. Furthermore, such coating methods can be performed once or several times until the desired film thickness is obtained.

The amount of application of the above-mentioned aqueous coating composition is preferably an amount that results in a cured film thickness of the intermediate coating film to be formed of 5 to 40 μm, more preferably an amount that results in a cured film thickness of 7 to 35 μm, and even more preferably an amount that results in a cured film thickness of 10 to 30 μm.

The above-mentioned basecoat coating composition may be a coating made by mixing a base resin having a crosslinkable functional group such as a carboxyl group, a hydroxyl group, etc., such as an acrylic resin, a polyester resin, an alkyd resin, a urethane resin, an epoxy resin, etc., and an amino resin such as a melamine resin, a urea resin, etc., a crosslinking agent such as a polyisocyanate compound which may be blocked, etc., together with pigments, thickeners, and other optional components.

The application method of the above-mentioned basecoat coating composition is not particularly limited, and for example, a wet coating film can be formed by an application method such as air spray coating, airless spray coating, rotary atomization coating, curtain coat coating, etc. In the aforementioned application methods, an electrostatic application may be performed, if necessary. Among the aforementioned, air spray coating and rotary atomization coating are especially preferable. The amount of application of the above-mentioned basecoat coating composition is normally an amount that results in a cured film thickness of 5 to 40 μm, more preferably an amount that results in a cured film thickness of 7 to 35 μm, and even more preferably an amount that results in a cured film thickness of 10 to 30 μm.

As the above-mentioned clear-coat coating composition, any one of the thermosetting clear coating material compositions known for coating automobile bodies, etc., can be used. Examples of the thermosetting clear coating material composition include, for example, organic solvents-type thermosetting coating compositions containing a base resin having a crosslinkable functional group and a curing agent (B), aqueous thermosetting coating compositions, powder thermosetting coating compositions, etc. Among the aforementioned, organic solvents-type thermosetting coating compositions containing a base resin having a crosslinkable functional group and a crosslinking agent are preferable from the viewpoint of the finished appearance, etc., of the multilayer coating film to be formed.

As the above-mentioned crosslinkable functional group of the base resin, for example, carboxyl group, hydroxyl group, epoxy group, alkoxysilyl group, etc., can be mentioned. Examples of the base resin include, for example, acrylic resin, polyester resin, alkyd resin, urethane resin, epoxy resin, fluorine resin, etc. Examples of the curing agent (B) include, for example, polyisocyanate compound, blocked polyisocyanate compound, melamine resin, urea resin, carboxyl group-containing compound, carboxyl group-containing resin, epoxy group-containing resin, epoxy group-containing compound, etc.

As the combination of the base resin/curing agent (B) of the above-mentioned clear-coat coating composition, a hydroxyl group-containing resin/polyisocyanate compound, a carboxyl group-containing resin/epoxy group-containing resin, a hydroxyl group-containing resin/blocked polyisocyanate compound, a hydroxyl group-containing resin/melamine resin, etc., are preferable, and a hydroxyl group-containing resin/polyisocyanate compound is more preferable. The above-mentioned clear-coat coating composition may be a one-component coating, or a multi-component coating such as a two-component urethane resin coating, etc.

The above-mentioned clear-coat coating composition may contain color pigments, luminous pigments, dyes, etc., if necessary, to the extent that transparency is not impaired. Furthermore, the same may contain extender pigments, UV absorbers, light stabilizers, defoamers, thickeners, rust inhibitors, surface conditioners, etc.

The application method of the clear-coat coating composition is not particularly limited, and for example, a wet coating film can be formed by an application method such as air spray coating, airless spray coating, rotary atomization coating, curtain coat coating, etc. In the aforementioned application methods, an electrostatic application may be performed, if necessary. Among the aforementioned, air spray coating and rotary atomization coating are especially preferable. The amount of application of the clear coating material composition is normally an amount that results in a cured film thickness of 10 to 70 μm, and more preferably an amount that results in a cured film thickness of 20 to 50 μm.

In addition, in a case where air spray coating, airless spray coating, and rotary atomization coating are performed, it is preferable to adjust the viscosity of the clear coating material composition if appropriate, using organic solvents, etc., so that the viscosity is within a range suitable for the coating, usually approximately 15 to 60 seconds, particularly approximately 20 to 50 seconds, at 20° C. in a Ford Cup No. 4 viscometer.

The above-mentioned heating can be performed by known means, and for example, drying ovens such as hot air ovens, electric ovens, infrared induction heating ovens, etc., can be used. The heating temperature is preferably within the range of 60 to 150° C., more preferably within the range of 70 to 120° C., and even more preferably within the range of 75 to 100° C. The heating time is not particularly limited, however, is preferably within the range of 10 to 90 minutes, and even more preferably within the range of 20 to 60 minutes.

Furthermore, the multilayer coating film can be formed according to, for example, the following method IIb, in a case where the aqueous coating composition of the present invention is used for the above-mentioned basecoat coating film.

<Method IIb>

A multilayer coating film forming method comprising steps of:

- a step (IIb-1) of forming an uncured intermediate coating film by applying an intermediate coating composition on an object to be coated;
- a step (IIb-2) of forming an uncured basecoat coating film by applying the aqueous coating composition of the present invention as the basecoat coating composition on the uncured intermediate coating film which has been formed in the above-mentioned step (IIb-1);
- a step (IIb-3) of forming an uncured clear-coat coating film by applying a clear-coat coating composition on the uncured basecoat coating film which has been formed in the above-mentioned step (IIb-2); and
- a step (IIb-4) of thermal curing the uncured intermediate coating film which has been formed in the above-mentioned step (IIb-1), the uncured basecoat coating film which has been formed in the above-mentioned step (IIb-2), and the uncured clear-coat coating film which has been formed in the above-mentioned step (IIb-3), at once.

As the above-mentioned object to be coated, the above-mentioned object to be coated exemplified in Method I can be used.

Furthermore, the surfaces of the objects to which the coating film is applied include automobile body exterior panel portion and interior panel portion, automobile parts, household electrical appliances, and metal surfaces of metal substrates such as steel plates, etc., that make up the aforementioned products, etc., that have been subjected to surface treatments such as phosphate treatment, chromate treatment, complex oxide treatment, etc.

A coating film may be formed on the object, which may or may not be surface-treated. For example, the object to be coated which is a substrate, may be surface-treated if necessary, and a primer coating film may be formed thereon. For example, in a case where the object to be coated is an automobile body, the primer coating film may be formed by using a known primer coating per se that is normally used in the coating of automobile bodies.

As a primer coating for forming the primer coating film, for example, an electrodeposition coating material, preferably a cationic electrodeposition coating material, may be used.

The above-mentioned intermediate coating composition may be a coating made by mixing a base resin having a crosslinkable functional group such as a carboxyl group, a hydroxyl group, etc., such as an acrylic resin, a polyester resin, an alkyd resin, a urethane resin, an epoxy resin, etc., and an amino resin such as a melamine resin, a urea resin, etc., a crosslinking agent such as a polyisocyanate compound which may be blocked, etc., together with pigments, thickeners, and other optional components.

The application method of the above-mentioned intermediate coating composition is not particularly limited, and for example, a wet coating film can be formed by an application method such as air spray coating, airless spray coating, rotary atomization coating, curtain coat coating, etc. In the aforementioned application methods, an electrostatic application may be performed, if necessary. Among the aforementioned, air spray coating and rotary atomization coating are especially preferable. The amount of application of the above-mentioned intermediate coating composition is normally an amount that results in a cured film thickness of 5 to 40 μm, more preferably an amount that results in a cured film thickness of 7 to 35 μm, and even more preferably an amount that results in a cured film thickness of 10 to 30 μm.

The above-mentioned aqueous coating composition can be applied to the object to be coated by a method known per se, for example, air spray coating, airless spray coating, rotary atomization coating, curtain coat coating, etc., and electrostatic application may be performed during coating. Among the aforementioned, air spray coating and rotary atomization coating are preferable. Furthermore, such coating methods can be performed once or several times until the desired film thickness is obtained.

The amount of application of the above-mentioned aqueous coating composition is preferably an amount that results in a cured film thickness of the basecoat coating film to be formed of 5 to 40 μm, more preferably an amount that results in a cured film thickness of 7 to 35 μm, and even more preferably an amount that results in a cured film thickness of 10 to 30 μm.

As the above-mentioned clear-coat coating composition, the above-mentioned clear-coat coating composition exemplified in the above-mentioned Method IIa can be used.

The application method of the clear-coat coating composition is not particularly limited, and for example, a wet coating film can be formed by an application method such as air spray coating, airless spray coating, rotary atomization coating, curtain coat coating, etc. In the aforementioned application methods, an electrostatic application may be performed, if necessary. Among the aforementioned, air spray coating and rotary atomization coating are especially preferable. The amount of application of the above-mentioned clear coating material composition is normally an amount that results in a cured film thickness of 10 to 70 μm, and more preferably an amount that results in a cured film thickness of 20 to 50 μm.

In addition, in a case where air spray coating, airless spray coating, and rotary atomization coating are performed, it is preferable to adjust the viscosity of the clear coating material composition if appropriate, using organic solvents, etc., so that the viscosity is within a range suitable for the coating, usually approximately 15 to 60 seconds, particularly approximately 20 to 50 seconds, at 20° C. in a Ford Cup No. 4 viscometer.

The above-mentioned heating can be performed by known means, and for example, drying ovens such as hot air ovens, electric ovens, infrared induction heating ovens, etc., can be used. The heating temperature is preferably within the range of 60 to 150° C., more preferably within the range of 70 to 120° C., and even more preferably within the range of 75 to 100° C. The heating time is not particularly limited, however, is preferably within the range of 10 to 90 minutes, and even more preferably within the range of 20 to 60 minutes.

Furthermore, the multilayer coating film can be formed according to, for example, the following method IIc, in a case where the aqueous coating composition of the present invention is used for the above-mentioned intermediate coating film and basecoat coating film.

The aqueous coating composition of the present invention used for forming the intermediate coating film and the aqueous coating composition of the present invention used for forming the basecoat coating film may or may not be the same.

<Method IIc>

A multilayer coating film forming method comprising steps of:

- a step (IIc-1) of forming an uncured intermediate coating film by applying the aqueous coating composition of the present invention as the intermediate coating composition on an object to be coated;
- a step (IIc-2) of forming an uncured basecoat coating film by applying the aqueous coating composition of the present invention as the basecoat coating composition on the uncured intermediate coating film which has been formed in the above-mentioned step (IIc-1);
- a step (IIc-3) of forming an uncured clear-coat coating film by applying a clear-coat coating composition on the uncured basecoat coating film which has been formed in the above-mentioned step (IIc-2); and
- a step (IIc-4) of thermal curing the uncured intermediate coating film which has been formed in the above-mentioned step (IIc-1), the uncured basecoat coating film which has been formed in the above-mentioned step (IIc-2), and the uncured clear-coat coating film which has been formed in the above-mentioned step (IIc-3), at once.

As the above-mentioned object to be coated, the above-mentioned object to be coated exemplified in Method I can be used.

Furthermore, the surfaces of the objects to which the coating film is applied include automobile body exterior panel portion and interior panel portion, automobile parts, household electrical appliances, and metal surfaces of metal substrates such as steel plates, etc., that make up the afore-mentioned products, etc., that have been subjected to surface treatments such as phosphate treatment, chromate treatment, complex oxide treatment, etc.

A coating film may be formed on the object, which may or may not be surface-treated. For example, the object to be coated which is a substrate, may be surface-treated if necessary, and a primer coating film may be formed thereon. For example, in a case where the object to be coated is an automobile body, the primer coating film may be formed by using a known primer coating per se that is normally used in the coating of automobile bodies.

As a primer coating for forming the primer coating film, for example, an electrodeposition coating material, preferably a cationic electrodeposition coating material, may be used.

The above-mentioned aqueous coating composition used for forming the above-mentioned intermediate coating film can be applied to the object to be coated by a method known per se, for example, air spray coating, airless spray coating, rotary atomization coating, curtain coat coating, etc., and electrostatic application may be performed during coating. Among the aforementioned, air spray coating and rotary atomization coating are preferable. Furthermore, such coating methods can be performed once or several times until the desired film thickness is obtained.

The amount of application of the above-mentioned aqueous coating composition used for forming the above-mentioned intermediate coating film is preferably an amount that results in a cured film thickness of the intermediate coating film to be formed of 5 to 40 μm, more preferably an amount that results in a cured film thickness of 7 to 35 μm, and even more preferably an amount that results in a cured film thickness of 10 to 30 μm.

The above-mentioned aqueous coating composition used for forming the above-mentioned basecoat coating film can be applied to the object to be coated by a method known per se, for example, air spray coating, airless spray coating, rotary atomization coating, curtain coat coating, etc., and electrostatic application may be performed during coating. Among the aforementioned, air spray coating and rotary atomization coating are preferable. Furthermore, such coating methods can be performed once or several times until the desired film thickness is obtained.

The amount of application of the above-mentioned aqueous coating composition used for forming the above-mentioned basecoat coating film is preferably an amount that results in a cured film thickness of the intermediate coating film to be formed of 5 to 40 μm, more preferably an amount that results in a cured film thickness of 7 to 35 μm, and even more preferably an amount that results in a cured film thickness of 10 to 30 μm.

As the above-mentioned clear-coat coating composition, the above-mentioned clear-coat coating composition exemplified in the above-mentioned Method IIa can be used.

The application method of the clear-coat coating composition is not particularly limited, and for example, a wet coating film can be formed by an application method such as air spray coating, airless spray coating, rotary atomization coating, curtain coat coating, etc. In the aforementioned application methods, an electrostatic application may be performed, if necessary. Among the aforementioned, air spray coating and rotary atomization coating are especially preferable. The amount of application of the above-mentioned clear coating material composition is normally an amount that results in a cured film thickness of 10 to 70 μm, and more preferably an amount that results in a cured film thickness of 20 to 50 μm.

In addition, in a case where air spray coating, airless spray coating, and rotary atomization coating are performed, it is preferable to adjust the viscosity of the clear coating material composition if appropriate, using organic solvents, etc., so that the viscosity is within a range suitable for the coating, usually approximately 15 to 60 seconds, particularly approximately 20 to 50 seconds, at 20° C. in a Ford Cup No. 4 viscometer.

The above-mentioned heating can be performed by known means, and for example, drying ovens such as hot air ovens, electric ovens, infrared induction heating ovens, etc., can be used. The heating temperature is preferably within the range of 60 to 150° C., more preferably within the range of 70 to 120° C., and even more preferably within the range of 75 to 100° C. The heating time is not particularly limited, however, is preferably within the range of 10 to 90 minutes, and even more preferably within the range of 20 to 60 minutes.

EXAMPLES

Hereinbelow, the present invention is more specifically described by mentioning production examples, examples, and comparative examples. However, the present invention is not limited to these examples. In each of the examples, "parts" and "%" is based on mass, unless particularly mentioned otherwise. Furthermore, the film thickness of the coating film is based on the cured coating film.

[Production of the Secondary Amino Group- and Alkoxysilyl Group-Containing Compound (a1)]

Production Example 1

A reaction vessel equipped with a thermometer, a thermostat, a stirring device, and a reflux condenser were charged with 55.89 parts of n-butyl acrylate and 0.01 parts of dibutylhydroxytoluene, and the contents of the reaction vessel were stirred and mixed under an air stream, and the temperature of the contents was raised to 50° C. Next, 44.1 parts of "KBM-602" (product name manufactured by Shin-Etsu Chemical Co., Ltd., N-2-(aminoethyl)-3-aminopropylmethyldimethoxysilane) was added dropwise for 2 hours into the reaction vessel maintained at the same temperature, and after the addition was completed, 1.0 part of butyl acetate was added to the reaction vessel, and the contents of the reaction vessel were aged for 2 hours. Next, the contents of the reaction vessel were discharged while being filtered through a 100-mesh nylon cloth, and the discharged matter was left to stand in a thermostatic chamber at 50° C. for one week, whereby the secondary amino group- and alkoxysilyl group-containing compound (a1-1) was obtained.

Production Examples 2 to 12

In the same manner as in Production Example 1, except that the blending composition in Production Example 1 was changed to those as shown in Table 1 below, the secondary amino group- and alkoxysilyl group-containing compounds (a1-2) to (a1-12) were obtained. Incidentally, in Table 1, compound (a1), compound (a11), compound (a11-1), and compound (a12) respectively refer to the secondary amino group- and alkoxysilyl group-containing compound (a1), the amino group- and alkoxysilyl group-containing compound (a11), primary amino group-, secondary amino group-, and alkoxysilyl group-containing compound (a11-1), and polymerizable unsaturated group-containing compound (a12), respectively.

TABLE 1

| | | | | Production examples | | | | | | | | | | | |
|---|---|---|---|---|---|---|---|---|---|---|---|---|---|---|---|
| | | | | 1 | 2 | 3 | 4 | 5 | 6 | 7 | 8 | 9 | 10 | 11 | 12 |
| Compound (a1) No. | | | | a1-1 | a1-2 | a1-3 | a1-4 | a1-5 | a1-6 | a1-7 | a1-8 | a1-9 | a1-10 | a1-11 | a1-12 |
| Compound (a1) | Compound (a11) | Compound (a11-1) | KBM-602 | 44.1 | | | 54.0 | 50.2 | 35.4 | 29.6 | 23.7 | 37.0 | 46.5 | 51.3 | 61.2 |
| | | | KBM-603 (Note 1) | | 46.0 | | | | | | | | | | |
| | | KBM-903 (Note 2) | | | | 62.9 | | | | | | | | | |
| | Compound (a12) | Methyl acrylate | | | | | 46.0 | | | | | | | | |
| | | Ethyl acrylate | | | | | | 49.78 | | | | | | | |
| | | n-Butyl acrylate | | 55.89 | 54.0 | 37.09 | | | | | | | | 48.73 | 38.79 |
| | | 2-Ethylhexyl acrylate | | | | | | | 64.6 | | | | | | |
| | | Lauryl acrylate | | | | | | | | 70.42 | | | | | |
| | | Isostearyl acrylate | | | | | | | | | 76.27 | | | | |
| | | Dimethyl maleate | | | | | | | | | | 63.03 | | | |
| | | 2-Hydroxyethyl acrylate | | | | | | | | | | | 53.48 | | |
| | Antioxidant | Dibutylhydroxytoluene | | 0.01 | 0.01 | 0.01 | 0.01 | 0.01 | 0.01 | 0.01 | 0.01 | 0.01 | 0.01 | 0.01 | 0.01 |

Incidentally, the components listed in the table are as follows.
(Note 1)
"KBM-603": product name manufactured by Shin-Etsu Chemical Co., Ltd., N-2-(aminoethyl)-3-aminopropyltrimethoxysilane
(Note 2)
"KBM-903": product name manufactured by Shin-Etsu Chemical Co., Ltd., 3-aminopropyltrimethoxysilane

[Production of the Urethane Resin (A) Particle Aqueous Dispersion]

Production Example 13

In a reaction vessel equipped with a thermometer, a thermostat, a stirring device, and a reflux condenser, 26.9 parts of "ETERNACOLL UH-200" (product name, manufactured by UBE Corporation, polycarbonate diol with 1,6-hexanediol as the main structure, molecular weight 2,000), 34.1 parts of "PTMG2000" (product name, manufactured by Mitsubishi Chemical Group Corporation, polytetramethylene ether glycol, molecular weight 2,000), 1.78 parts of 1,4-cyclohexanedimethanol, 4.8 parts of dimethylolpropionic acid, 0.04 parts of "NEOSTANN U-600" (product name, manufactured by Nitto Kasei Co., Ltd., bismuth-based catalyst) and 50.0 parts of methyl ethyl ketone were charged, and the contents of the reaction vessel were heated to 80° C. while stirring and mixing the contents of the reaction vessel in an air stream, after which 9.3 parts of isophorone diisocyanate and 16.2 parts of dicyclohexylmethane-4,4'-diisocyanate were added dropwise to the reaction vessel for 30 minutes. The contents of the reaction vessel were then reacted until the retained free isocyanate group content was 1.6% or less, whereby a urethane prepolymer solution was obtained.

Then, the above-mentioned obtained urethane prepolymer solution was cooled to 60° C., and 3.43 parts of the secondary amino group- and alkoxysilyl group-containing compound (a1) obtained in Production example 1 was dropped into the reaction vessel for 10 minutes. After the dropping was completed, the contents of the reaction vessel were aged for 20 minutes and cooled to room temperature.

Then, 2.5 parts of triethylamine and 142.6 parts of deionized water were dropped into the reaction vessel for 60 minutes. After the contents of the reaction vessel were emulsified, 17.8 parts of a 5% aqueous ethylenediamine solution was dropped into the reaction vessel for 15 minutes to carry out a chain extension reaction.

Thereafter, the solvent was distilled off from the reaction vessel under reduced pressure, and the concentration of the contents of the reaction vessel was adjusted using deionized water to obtain a urethane resin (A-1) particle aqueous dispersion with a solid content concentration of 35%, an acid value of 20 mg KOH/g, and an average particle diameter of 100 nm (measured at 20° C. using a particle size distribution measuring device "ELSZ-2000" (product name, manufactured by OTSUKA ELECTRONICS CO., LTD) adopting dynamic light scattering method, diluted with deionized water).

Production Examples 14 to 51

In the same manner as in Production Example 13, except that the blending composition in Production Example 13 was changed to those as shown in Table 2 below, the urethane resin (A-2) to (A-39) particle aqueous dispersions were obtained.

Incidentally, in Table 2, the compound (a1) and the urethane prepolymer (a2) respectively refer the secondary amino group- and alkoxysilyl group-containing compound (a1), and the isocyanate group-containing urethane prepolymer (a2).

TABLE 2

| | | | | Production examples | | | | | | |
|---|---|---|---|---|---|---|---|---|---|---|
| | | | | 13 | 14 | 15 | 16 | 17 | 18 | 19 |
| Urethane resin (A) No. | | | | A-1 | A-2 | A-3 | A-4 | A-5 | A-6 | A-7 |
| Compound (a1) KBM-602 | Compound (a1) No. | | | a1-1 | a1-2 | a1-3 | a1-4 | a1-5 | a1-6 | a1-7 |
| | Compound (a1) amount | | | 3.43 | 2.39 | 1.55 | 2.83 | 3.04 | 4.23 | 5.01 |
| Urethane prepolymer (a2) | Polyisocyanate component (a21) | Alicyclic polyisocyanate compound (a21-1) | Isophorone diisocyanate | 9.3 | 9.4 | 9.4 | 9.3 | 9.3 | 9.3 | 9.2 |
| | | | Dicyclohexylmethane-4,4'-diisocyanate | 16.2 | 16.4 | 16.6 | 16.3 | 16.3 | 16.1 | 15.9 |
| | | Hexamethylene diisocyanate | | | | | | | | |
| | Polyol component (a22) | Polycarbonate polyol (a22-1) | ETERNACOLL UH-200 | 26.9 | 27.2 | 27.5 | 27.2 | 27.1 | 26.7 | 26.4 |
| | | | ETERNACOLL UM-90 (3/1) (Note 3) | | | | | | | |
| | | | ETERNACOLL UC-100 (Note 4) | | | | | | | |
| | | | ETERNACOLL UP-200 (Note 5) | | | | | | | |
| | | | Kuraray Polyol C-3090 (Note 6) | | | | | | | |
| | | Polyether polyol (a22-2) | PTMG3000 (Note 7) | | | | | | | |
| | | | PTMG2000 | 34.1 | 34.4 | 34.8 | 34.4 | 34.3 | 33.8 | 33.5 |
| | | | PTMG1000 (Note 8) | | | | | | | |
| | | | SANNIX PP-2000 (Note 9) | | | | | | | |
| | | Dimethylolpropionic acid | | 4.8 | 4.9 | 4.8 | 4.7 | 4.8 | 4.8 | 4.8 |
| | | 1,4-Cyclohexanedimethanol | | 1.78 | 1.80 | 1.82 | 1.80 | 1.79 | 1.77 | 1.75 |
| Neutralizing agent | Triethylamine | | | 2.5 | 2.6 | 2.5 | 2.5 | 2.5 | 2.5 | 2.5 |
| | Dimethylethanolamine | | | | | | | | | |
| Chain extender (a3) | Ethylenediamine | | | 0.89 | 0.98 | 0.99 | 0.90 | 0.90 | 0.88 | 0.88 |
| | Isophoronediamine | | | | | | | | | |
| | Diethylenetriamine | | | | | | | | | |
| | Triethylenetetraamine | | | | | | | | | |
| Catalyst | NEOSTANN U-600 | | | 0.04 | 0.04 | 0.04 | 0.04 | 0.04 | 0.04 | 0.04 |

| | | | | Production examples | | | | | |
|---|---|---|---|---|---|---|---|---|---|
| | | | | 20 | 21 | 22 | 23 | 24 | 25 |
| Urethane resin (A) No. | | | | A-8 | A-9 | A-10 | A-11 | A-12 | A-13 |
| Compound (a1) KBM-602 | Compound (a1) No. | | | a1-8 | a1-9 | a1-10 | a1-11 | a1-12 | a1-1 |
| | Compound (a1) amount | | | 6.14 | 2.54 | 3.26 | 2.98 | 2.51 | 8.62 |
| Urethane prepolymer (a2) | Polyisocyanate component (a21) | Alicyclic polyisocyanate compound (a21-1) | Isophorone diisocyanate | 9.2 | 9.3 | 9.3 | 9.3 | 9.3 | 9.2 |
| | | | Dicyclohexylmethane-4,4'-diisocyanate | 15.7 | 16.4 | 16.3 | 16.3 | 16.4 | 15.3 |
| | | Hexamethylene diisocyanate | | | | | | | |

TABLE 2-continued

| | | | | | | | | | |
|---|---|---|---|---|---|---|---|---|---|
| | Polyol component (a22) | Polycarbonate polyol (a22-1) | ETERNACOLL UH-200 | 26.0 | 27.2 | 27.0 | 27.1 | 27.2 | 25.3 |
| | | | ETERNACOLL UM-90 (3/1) (Note 3) | | | | | | |
| | | | ETERNACOLL UC-100 (Note 4) | | | | | | |
| | | | ETERNACOLL UP-200 (Note 5) | | | | | | |
| | | | Kuraray Polyol C-3090 (Note 6) | | | | | | |
| | | Polyether polyol (a22-2) | PTMG3000 (Note 7) | | | | | | |
| | | | PTMG2000 | 33.0 | 34.5 | 34.2 | 34.3 | 34.5 | 32.1 |
| | | | PTMG1000 (Note 8) | | | | | | |
| | | | SANNIX PP-2000 (Note 9) | | | | | | |
| | | Dimethylolpropionic acid | | 4.8 | 4.8 | 4.8 | 4.8 | 4.8 | 4.8 |
| | | 1,4-Cyclohexanedimethanol | | 1.73 | 1.80 | 1.79 | 1.79 | 1.80 | 1.68 |
| Neutralizing agent | Triethylamine | | | 2.5 | 2.5 | 2.5 | 2.5 | 2.5 | 2.5 |
| | Dimethylethanolamine | | | | | | | | |
| Chain extender (a3) | Ethylenediamine | | | 0.86 | 0.90 | 0.89 | 0.90 | 0.90 | 0.49 |
| | Isophoronediamine | | | | | | | | |
| | Diethylenetriamine | | | | | | | | |
| | Triethylenetetraamine | | | | | | | | |
| Catalyst | NEOSTANN U-600 | | | 0.04 | 0.04 | 0.04 | 0.04 | 0.04 | 0.04 |

| | | | | Production examples | | | | | | |
|---|---|---|---|---|---|---|---|---|---|---|
| | | | | 26 | 27 | 28 | 29 | 30 | 31 | 32 |
| Urethane resin (A) No. | | | | A-14 | A-15 | A-16 | A-17 | A-18 | A-19 | A-20 |
| Compound (a1) KBM-602 | Compound (a1) No. | | | a1-1 | a1-1 | a1-1 | a1-1 | a1-1 | a1-1 | a1-1 |
| | Compound (a1) amount | | | 11.44 | 2.32 | 0.59 | 3.79 | 3.44 | 3.50 | 3.49 |
| Urethane prepolymer (a2) | Polyisocyanate component (a21) | Alicyclic polyisocyanate compound (a21-1) | Isophorone diisocyanate | 9.2 | 9.3 | 9.4 | | 9.3 | 12.0 | 11.5 |
| | | | Dicyclohexylmethane-4,4'-diisocyanate | 14.7 | 16.4 | 16.7 | | 16.2 | 16.5 | 16.5 |
| | | Hexamethylene diisocyanate | | | | | 18.6 | | | |
| | Polyol component (a22) | Polycarbonate polyol (a22-1) | ETERNACOLL UH-200 | 24.5 | 27.3 | 27.8 | 29.7 | | | |
| | | | ETERNACOLL UM-90 (3/1) (Note 3) | | | | | | 23.2 | |
| | | | ETERNACOLL UC-100 (Note 4) | | | | | | | 23.9 |
| | | | ETERNACOLL UP-200 (Note 5) | | | | | | | |
| | | | Kuraray Polyol C-3090 (Note 6) | | | | | | | |
| | | Polyether polyol (a22-2) | PTMG3000 (Note 7) | | | | | | | |
| | | | PTMG2000 | 31.0 | 34.5 | 35.2 | 37.6 | 61.0 | 34.7 | 34.6 |
| | | | PTMG1000 (Note 8) | | | | | | | |
| | | | SANNIX PP-2000 (Note 9) | | | | | | | |
| | | Dimethylolpropionic acid | | 4.8 | 4.8 | 4.8 | 4.8 | 4.8 | 4.8 | 4.8 |
| | | 1,4-Cyclohexanedimethanol | | 1.62 | 1.81 | 1.84 | 1.97 | 1.79 | 1.82 | 1.81 |
| Neutralizing agent | Triethylamine | | | 2.5 | 2.5 | 2.5 | 2.5 | 2.5 | 2.5 | 2.5 |
| | Dimethylethanolamine | | | | | | | | | |
| Chain extender (a3) | Ethylenediamine | | | 0.27 | 0.98 | 1.11 | 0.98 | 0.89 | 0.91 | 0.91 |
| | Isophoronediamine | | | | | | | | | |
| | Diethylenetriamine | | | | | | | | | |
| | Triethylenetetraamine | | | | | | | | | |
| Catalyst | NEOSTANN U-600 | | | 0.04 | 0.04 | 0.04 | 0.04 | 0.04 | 0.04 | 0.04 |

| | | | | Production examples | | | | | |
|---|---|---|---|---|---|---|---|---|---|
| | | | | 33 | 34 | 35 | 36 | 37 | 38 |
| Urethane resin (A) No. | | | | A-21 | A-22 | A-23 | A-24 | A-25 | A-26 |
| Compound (a1) KBM-602 | Compound (a1) No. | | | a1-1 | a1-1 | a1-1 | a1-1 | a1-1 | a1-1 |
| | Compound (a1) amount | | | 3.43 | 3.49 | 3.50 | 3.50 | 3.50 | 3.51 |
| Urethane prepolymer (a2) | Polyisocyanate component (a21) | Alicyclic polyisocyanate compound (a21-1) | Isophorone diisocyanate | 9.3 | 8.3 | 9.1 | 9.2 | 9.1 | 8.1 |
| | | | Dicyclohexylmethane-4,4'-diisocyanate | 16.2 | 16.5 | 16.5 | 16.5 | 16.5 | 16.6 |
| | | Hexamethylene diisocyanate | | | | | | | |
| | Polyol component (a22) | Polycarbonate polyol (a22-1) | ETERNACOLL UH-200 | | | 44.9 | 10.0 | 60.8 | 27.5 |
| | | | ETERNACOLL UM-90 (3/1) (Note 3) | | | | | | |
| | | | ETERNACOLL UC-100 (Note 4) | | | | | | |

TABLE 2-continued

| | | | | | | | | | |
|---|---|---|---|---|---|---|---|---|---|
| | | | ETERNACOLL UP-200 (Note 5) | 26.9 | | | | | |
| | | | Kuraray Polyol C-3090 (Note 6) | | 26.9 | | | | |
| | | Polyether polyol (a22-2) | PTMG3000 (Note 7) | | | | | | 34.2 |
| | | | PTMG2000 | 34.1 | 34.7 | 15.9 | 50.8 | | |
| | | | PTMG1000 (Note 8) | | | | | | |
| | | | SANNIX PP-2000 (Note 9) | | | | | | |
| | | Dimethylolpropionic acid | | 4.8 | 4.8 | 4.8 | 4.8 | 4.8 | 4.8 |
| | | 1,4-Cyclohexanedimethanol | | 1.78 | 1.81 | 1.82 | 1.82 | 1.82 | 1.82 |
| Neutralizing agent | Triethylamine | | | 2.5 | 2.5 | 2.5 | 2.5 | 2.5 | 2.5 |
| | Dimethylethanolamine | | | | | | | | |
| Chain extender (a3) | Ethylenediamine | | | 0.89 | 0.91 | 0.91 | 0.91 | 0.91 | 0.91 |
| | Isophoronediamine | | | | | | | | |
| | Diethylenetriamine | | | | | | | | |
| | Triethylenetetraamine | | | | | | | | |
| Catalyst | NEOSTANN U-600 | | | 0.04 | 0.04 | 0.04 | 0.04 | 0.04 | 0.04 |

| | | | | Production examples | | | | | | |
|---|---|---|---|---|---|---|---|---|---|---|
| | | | | 39 | 40 | 41 | 42 | 43 | 44 | 45 |
| Urethane resin (A) No. | | | | A-27 | A-28 | A-29 | A-30 | A-31 | A-32 | A-33 |
| Compound (a1) | Compound (a1) No. | | | a1-1 | a1-1 | a1-1 | a1-1 | a1-1 | a1-1 | a1-1 |
| | Compound (a1) amount | | | 3.51 | 3.51 | 3.51 | 3.51 | 3.45 | 3.47 | 3.37 |
| KBM-602 | | | | | | | | | | |
| Urethane prepolymer (a2) | Polyisocyanate component (a21) | Alicyclic polyisocyanate compound (a21-1) | Isophorone diisocyanate | 12.0 | 9.1 | 9.2 | 9.1 | 9.4 | 9.3 | 9.3 |
| | | | Dicyclohexylmethane-4,4'-diisocyanate | 16.5 | 16.5 | 16.6 | 16.6 | 16.3 | 16.4 | 15.9 |
| | | Hexamethylene diisocyanate | | | | | | | | |
| | Polyol component (a22) | Polycarbonate polyol (a22-1) | ETERNACOLL UH-200 | 27.5 | 27.5 | 5.0 | 55.8 | 27.0 | 27.2 | 26.4 |
| | | | ETERNACOLL UM-90 (3/1) (Note 3) | | | | | | | |
| | | | ETERNACOLL UC-100 (Note 4) | | | | | | | |
| | | | ETERNACOLL UP-200 (Note 5) | | | | | | | |
| | | | Kuraray Polyol C-3090 (Note 6) | | | | | | | |
| | | Polyether polyol (a22-2) | PTMG3000 (Note 7) | | | | | | | |
| | | | PTMG2000 | | | 55.7 | 5.0 | 34.2 | 34.5 | 33.5 |
| | | | PTMG1000 (Note 8) | 30.4 | | | | | | |
| | | | SANNIX PP-2000 (Note 9) | | 33.3 | | | | | |
| | | Dimethylolpropionic acid | | 4.8 | 4.8 | 4.8 | 4.8 | 4.8 | 4.8 | 4.8 |
| | | 1,4-Cyclohexanedimethanol | | 1.82 | 1.82 | 1.82 | 1.82 | 1.79 | 1.80 | 1.75 |
| Neutralizing agent | Triethylamine | | | 2.5 | 2.5 | 2.5 | 2.5 | | 2.5 | 2.5 |
| | Dimethylethanolamine | | | | | | | 2.1 | | |
| Chain extender (a3) | Ethylenediamine | | | 0.9107 | 0.91 | 0.91 | 0.91 | 0.90 | | |
| | Isophoronediamine | | | | | | | | | 2.48 |
| | Diethylenetriamine | | | | | | | | | |
| | Triethylenetetraamine | | | | | | | | | |
| Catalyst | NEOSTANN U-600 | | | 0.04 | 0.04 | 0.04 | 0.04 | 0.04 | 0.04 | 0.04 |

| | | | | Production examples | | | | | |
|---|---|---|---|---|---|---|---|---|---|
| | | | | 46 | 47 | 48 | 49 | 50 | 51 |
| Urethane resin (A) No. | | | | A-34 | A-35 | A-36 | A-37 | A-38 | A-39 |
| Compound (a1) | Compound (a1) No. | | | a1-1 | a1-1 | a1-1 | a1-1 | | |
| | Compound (a1) amount | | | 3.43 | 3.43 | 3.42 | 3.45 | | |
| KBM-602 | | | | | | | | | 1.57 |
| Urethane prepolymer (a2) | Polyisocyanate component (a21) | Alicyclic polyisocyanate compound (a21-1) | Isophorone diisocyanate | 9.3 | 9.3 | 9.3 | 9.3 | 9.3 | 9.2 |
| | | | Dicyclohexylmethane-4,4'-diisocyanate | 16.2 | 16.2 | 16.2 | 16.3 | 16.9 | 16.6 |
| | | Hexamethylene diisocyanate | | | | | | | |
| | Polyol component (a22) | Polycarbonate polyol (a22-1) | ETERNACOLL UH-200 | 26.9 | 26.9 | 26.8 | 27.1 | 28.0 | 27.6 |
| | | | ETERNACOLL UM-90 (3/1) (Note 3) | | | | | | |
| | | | ETERNACOLL UC-100 (Note 4) | | | | | | |
| | | | ETERNACOLL UP-200 (Note 5) | | | | | | |
| | | | Kuraray Polyol C-3090 (Note 6) | | | | | | |

TABLE 2-continued

| | | | | | | | | |
|---|---|---|---|---|---|---|---|---|
| | | Polyether polyol (a22-2) | PTMG3000 (Note 7) | | | | | |
| | | | PTMG2000 | 34.1 | 34.0 | 34.0 | 34.3 | 35.5 | 35.0 |
| | | | PTMG1000 (Note 8) | | | | | | |
| | | | SANNIX PP-2000 (Note 9) | | | | | | |
| | | Dimethylolpropionic acid | | 4.8 | 4.8 | 4.8 | 4.8 | 4.8 | 4.7 |
| | | 1,4-Cyclohexanedimethanol | | 1.78 | 1.78 | 1.78 | 1.79 | 1.86 | 1.83 |
| Neutralizing agent | Triethylamine | | | 2.5 | 2.5 | 2.5 | 2.5 | 2.5 | 2.5 |
| | Dimethylethanolamine | | | | | | | | |
| Chain extender (a3) | Ethylenediamine | | | | | 1.2 | 0.5 | 1.16 | 0.92 |
| | Isophoronediamine | | | | | | | | |
| | Diethylenetriamine | | | 1.02 | | | | | |
| | Triethylenetetraamine | | | | 1.08 | | | | |
| Catalyst | NEOSTANN U-600 | | | 0.04 | 0.04 | 0.04 | 0.04 | 0.04 | 0.04 |

Incidentally, the components listed in the table are as follows.

(Note 3)

"ETERNACOLL UM-90 (3/1)": product name, manufactured by UBE Corporation, polycarbonate diol with 1,6-hexanediol and 1,4-cyclohexanedimethanol as the main structure, molecular weight 900

(Note 4)

"ETERNACOLL UC-100": product name, manufactured by UBE Corporation, polycarbonate diol with 1,4-cyclohexanedimethanol as the main structure, molecular weight 1,000

(Note 5)

"ETERNACOLL UP-200": product name, manufactured by manufactured by UBE Corporation, polycarbonate diol, molecular weight 2,000

(Note 6)

"Kuraray Polyol C-3090": product name, manufactured by KURARAY CO., LTD, polycarbonate diol, molecular weight 3,000

(Note 7)

"PTMG3000": product name, manufactured by Mitsubishi Chemical Group Corporation, polytetramethylene ether glycol, molecular weight 3,000

(Note 8)

"PTMG1000": product name, manufactured by Mitsubishi Chemical Group Corporation, polytetramethylene ether glycol, molecular weight 1000

(Note 9)

"SANNIX PP-2000": product name, manufactured by Sanyo Chemical Industries, Ltd., polypropylene glycol, molecular weight 2000)

[Production of the Acrylic Resin (C)]

Production Example 52

A reaction vessel equipped with a thermometer, a thermostat, a stirring device, a reflux condenser, a nitrogen inlet tube, and a dropping device was charged with 120 parts of deionized water and 0.8 parts of "ADEKA REASOAP SR-1025" (product name, manufactured by ADEKA CORPORATION, emulsifier, active ingredient 25%), and the contents of the reaction vessel were stirred and mixed under a nitrogen stream, and the temperature of the contents was raised to 80° C.

Next, 5% of the total amount of the monomer emulsion for the core portion described below and 2.5 parts of a 6% aqueous solution of ammonium persulfate were introduced into the reaction vessel, and the contents of the reaction vessel were held at 80° C. for 15 minutes. The remainder of the monomer emulsion for the core portion was then dropped into the reaction vessel held at the same temperature for a period of 3 hours, and after the dropping was completed, the contents of the reaction vessel were aged for 1 hour. Next, the monomer emulsion for the shell portion described below was added dropwise for 1 hour, and after aging for 1 hour, 3.8 parts of a 5% aqueous solution of 2-(dimethylamino)ethanol was gradually added to the reaction vessel while cooling the contents of the reaction vessel to 30° C. The contents of the reaction vessel were discharged while being filtered through a 100-mesh nylon cloth, and an acrylic resin (C-1) particle dispersion with an average particle size of 100 nm and a solid content of 30% was obtained. The obtained acrylic resin (C-1) particles had an acid value of 17.2 mg KOH/g and a hydroxyl value of 27.2 mg KOH/g.

Monomer Emulsion for the Core Portion:

54 parts of deionized water, 3.1 parts of "ADEKA REASOAP SR-1025", 1 part of allyl methacrylate, 10 parts of styrene, 35 parts of n-butyl acrylate, 10 parts of methyl methacrylate, 20 parts of ethyl acrylate, and 1 part of 2-hydroxyethyl methacrylate were mixed and stirred, whereby the monomer emulsion for the core portion was obtained.

Monomer Emulsion for the Shell Portion:

50 parts of deionized water, 1.8 parts of "ADEKA REASOAP SR-1025", 0.04 parts of ammonium persulfate, 5.3 parts of 2-hydroxyethyl acrylate, 2.6 parts of methacrylic acid, 8 parts of ethyl acrylate, and 7.1 parts of methyl methacrylate were mixed and stirred, whereby the monomer emulsion for the shell portion was obtained.

[Production of the Polyester Resin (D)]

Production Example 53

A reaction vessel equipped with a thermometer, a thermostat, a stirring device, a reflux condenser, and a water separator was charged with 126 parts of trimesic acid, 1,365 parts of "PTMG650" (product name, manufactured by Mitsubishi Chemical Group Corporation, polytetramethylene ether glycol, molecular weight 650), and 37 parts of glycerin, and the contents of the reaction vessel were heated between 160° C. and 230° C. for a period of 3 hours, after which the contents were subjected to a condensation reaction at 230° C. until the end point acid value reached 3 mgKOH/g. Next, in order to add carboxyl groups to the obtained condensation reaction product, 77 parts of trimellitic anhydride was further added to the reaction vessel, and the contents of the reaction vessel were reacted at 170° C. for 30 minutes, after which 0.5 equivalents of 2-(dimethylamino)ethanol relative to the acid groups were added to the reaction vessel, and the contents were further diluted with 2-ethyl-1-hexanol, whereby the polyester resin (D-1) solution with a solid content concentration of 70% was obtained. The obtained polyester resin (D-1) had an acid value of 32 mg KOH/g, a hydroxyl value of 117 mg KOH/g, a solid content concentration of 70%, and a number average molecular weight of 1,200.

[Production of the Blocked Polyisocyanate Compound (B4)]

Production Example 54

A reaction vessel equipped with a thermometer, a thermostat, a stirring device, a reflux condenser, a nitrogen inlet tube, a dropping device, and a simple solvent removal trap was charged with 360 parts of "Sumidur N-3300", 60 parts of "Uniox M-550" (NOF CORPORATION, polyethylene glycol monomethyl ether, average molecular weight approximately 550) and 0.2 parts of 2,6-di-tert-butyl-4-methylphenol, and the contents of the reaction vessel were then mixed thoroughly and heated at 130° C. for 3 hours under a nitrogen stream. Next, 110 parts of ethyl acetate and 252 parts of diisopropyl malonate were charged into the reaction vessel, and 3 parts of a 28% methanol solution of sodium methoxide were added to the reaction vessel while stirring the contents of the reaction vessel under a nitrogen stream, and the contents of the reaction vessel were then stirred at 65° C. for 8 hours. The amount of isocyanate in the obtained resin solution was 0.12 mol/kg. 683 parts of 4-methyl-2-pentanol was added to the reaction vessel, and the solvent was distilled off under reduced pressure conditions for 3 hours while maintaining the temperature of the system at 80 to 85° C., whereby 1,010 parts of an active methylene-based blocked polyisocyanate compound (B4-1) solution was obtained. 95 parts of isopropanol were contained in the simple solvent removal trap. The solid content concentration of the obtained active methylene-based blocked polyisocyanate compound (B4-1) solution was approximately 60%.

[Production of the Phosphoric Acid Group-Containing Dispersion Resin (R)]

Production Example 55

A reaction vessel equipped with a thermometer, a thermostat, stirring device, a reflux condenser, a nitrogen inlet tube and a dropping device was charged with a mixed solvent of 27.5 parts of methoxypropanol and 27.5 parts of isobutanol, and the contents of the reaction vessel are heated to 110° C. 121.5 parts of a mixture consisting of 25 parts of styrene, 27.5 parts of n-butyl methacrylate, 20 parts of "isostearyl acrylate" (product name, manufactured by OSAKA ORGANIC CHEMICAL INDUSTRY LTD., branched higher alkyl acrylate), 7.5 parts of 4-hydroxybutyl acrylate, 15 parts of phosphoric acid group-containing polymerizable unsaturated monomer (Note 1), 12.5 parts of 2-methacryloyloxyethyl acid phosphate, 10 parts of isobutanol and 4 parts of t-butyl peroxy octanoate are added to the above-mentioned reaction vessel for a period of 4 hours, and a mixture of 0.5 parts of t-butyl peroxyoctanoate and 20 parts of isopropanol was added dropwise to the reaction vessel for 1 hour. The contents of the reaction vessel were then stirred and aged for 1 hour, whereby a phosphoric acid group-containing dispersion resin (R-1) solution with a solid content concentration of 50% was obtained. The acid value of this resin due to the phosphoric acid group was 83 mg KOH/g, the hydroxyl value was 29 mg KOH/g, and the weight average molecular weight was 10,000.

(Note 1) Phosphate group-containing polymerizable unsaturated monomer: a reaction vessel equipped with a thermometer, a thermostat, a stirring device, a reflux condenser, a nitrogen inlet tube, and a dropping device was charged with 57.5 parts of monobutyl phosphate and 41 parts of isobutanol, and the contents of the reaction vessel were heated to 90° C., after which 42.5 parts of glycidyl methacrylate was added dropwise to the reaction vessel for 2 hours, and the contents of the reaction vessel were further stirred and aged for 1 hour. Thereafter, 59 parts of isopropanol were added to the reaction vessel, whereby a phosphate group-containing polymerizable unsaturated monomer solution with a solid content concentration of 50% was obtained. The acid value of the obtained monomer due to the phosphate group was 285 mgKOH/g.

[Production of the Pigment Dispersion (P)]

Production Example 56

In a container equipped with a stirring device, 28.6 parts of the polyester resin (D-1) solution obtained in Production example 53 (20 parts of solid content), 90 parts of "JR-806" (product name, manufactured by TAYCA Co., Ltd., rutile-based titanium dioxide), 30 parts of "BARIACE B-35" (product name, manufactured by SAKAI CHEMICAL INDUSTRY CO., LTD., barium sulfate powder), 0.8 parts of "Carbon MA100" (product name, Mitsubishi Chemical Group Corporation, carbon black), and 10 parts of deionized water were mixed, and the pH of the contents of the container was adjusted to 8.0 by using 2-(dimethylamino) ethanol. The resulting mixture was then placed in a wide-mouth glass bottle, glass beads with a diameter of approximately 1.3 mmφ were added as a dispersion medium, the bottle was sealed, and the mixture was dispersed for 30 minutes by using a paint shaker, whereby the pigment dispersion (P-1) was obtained.

Production Example 57

In a container equipped with a stirring device, 66.7 parts of the acrylic resin (C-1) particle dispersion obtained in Production example 52 (20 parts of solid content), 10 parts of "Carbon MA-100" (product name, Mitsubishi Chemical Group Corporation, carbon black), and 50 parts of deionized water were placed, and the contents of the container were mixed uniformly, and the pH of the contents of the container was adjusted to 7.5 by using 2-(dimethylamino)ethanol. The resulting mixture was then placed in a wide-mouth glass bottle, glass beads with a diameter of approximately 1.3 mmφ were added as a dispersion medium, the bottle was sealed, and the mixture was dispersed for 4 hours by using a paint shaker, whereby the pigment dispersion (P-2) was obtained.

[Preparation of the Aqueous Coating Composition]

Example 1

128.6 parts of the urethane resin (A-1) particle aqueous dispersion obtained in Production example 13 (45 parts of solid content), 50 parts of the acrylic resin (C-1) particle dispersion obtained in Production example 52 (15 parts of solid content), 25 parts of "Carbodilite SV02" (product name, manufactured by Nisshinbo Holdings Inc., carbodiimide compound with a solid content of 40%, 429 carbodiimide equivalent per solid content) (10 parts of solid content), 6.25 parts of "Cymel 325" (product name, manufactured by Allnex Japan Inc., melamine resin solid content concentration of 80%) (5 parts of solid content), 8.3 parts of the active methylene-based blocked polyisocyanate compound (B4-1) solution obtained in Production example 54 (5 parts of solid content), and 159.4 parts of the pigment dispersion (P-1) obtained in Production example 56 (20 parts of resin solid content) were mixed uniformly to form a mixture, and "UH-752" (product name, manufactured by ADEKA CORPORATION, the thickener, solid content concentration of 28%), 2-(dimethylamino)ethanol and deionized water were further added to the mixture, whereby the aqueous coating composition No. 1 having a pH of 8.0, a solid content concentration of 48%, and a viscosity of 800 mPa·s after 1 minute at 60 rpm as measured with a B-type viscometer at a temperature of 20° C., was obtained.

Examples 2 to 44 and Comparative Examples 1 to 4

In the same manner as in the aqueous coating composition No. 1 of Example 1, except that the coating composition in Example 1 was changed to those as shown in Table 3 below, the aqueous coating compositions No. 2 to 44 and the aqueous coating compositions No. 89 to 92 were obtained.

Example 45

85.7 parts of the urethane resin (A-1) particle aqueous dispersion obtained in Production example 13 (30 parts of solid content), 93.3 parts of the acrylic resin (C-1) particle dispersion obtained in Production example 52 (28 parts of solid content), 25 parts of "Carbodilite SV02" (product name, manufactured by Nisshinbo Holdings Inc., carbodiimide compound with a solid content of 40%, 429 carbodiimide equivalent per solid content) (10 parts of solid content), 6.25 parts of "Cymel 325" (product name, manufactured by Allnex Japan Inc., melamine resin solid content concentration of 80%) (5 parts of solid content), 8.3 parts of the active methylene-based blocked polyisocyanate compound (B4-1) solution obtained in Production example 54 (5 parts of solid content), 126.7 parts of the pigment dispersion (P-2) obtained in Production example 57 (20 parts of resin solid content), and 4 parts of the phosphate group-containing acrylic resin (R-1) obtained in Production example 55 (2 parts of solid content) were mixed uniformly to form a mixture, and "UH-752" (product name, manufactured by ADEKA CORPORATION, the thickener, solid content concentration of 28%), 2-(dimethylamino)ethanol and deionized water were further added to the mixture, whereby the aqueous coating composition No. 45 having a pH of 8.0, a solid content concentration of 25%, and a viscosity of 800 mPa·s after 1 minute at 60 rpm as measured with a B-type viscometer at a temperature of 20° C., was obtained.

Examples 46 to 88 and Comparative Examples 5 to 8

In the same manner as in the aqueous coating composition No. 45 of Example 45, except that the coating composition in Example 45 was changed to those as shown in Table 3 below, the aqueous coating compositions No. 46 to 88 and the aqueous coating compositions No. 93 to 96 were obtained.

[Gel Fraction]

The gel fraction of each of the aqueous coating compositions obtained in Examples 1 to 88 and Comparative examples 1 to 8 was measured according to the method described in this description. The gel fraction measurement results are shown in Table 3.

[Storage Stability Test]

The storage stability of each of the aqueous coating compositions obtained in Examples 1 to 88 and Comparative examples 1 to 8 was evaluated based on the viscosity after 1 minute at 60 rpm measured with the "LVDV-I" (product name, manufactured by BROOKFIELD, B-type viscometer), by the viscosity change rate between the viscosity immediately after production and the viscosity after standing at 40° C. for 10 days, as expressed by the following formula:

$$\text{Viscosity change rate (\%)} = |(\text{viscosity after standing at } 40°\text{ C. for 10 days}/\text{viscosity immediately after production}) - 1| \times 100$$

"E" (standing for excellent), and "G" (standing for good) are acceptable. The evaluation results are shown in Table 3.

E (standing for excellent): Viscosity change rate is less than 50%.

G (standing for good): The viscosity change rate is 50% or more and less than 100%.

P (standing for poor): The viscosity change rate is 100% or more.

[Abrasion Resistance Property Test]

An electrodeposited coating film was formed by electrodepositing "Elecron GT-10" (product name, manufactured by Kansai Paint Co., Ltd., cationic electrodeposition coating material) on a cold-rolled steel sheet that had been subjected to zinc phosphate conversion treatment to a dry film thickness of 20 μm, and the electrodeposited coating film was heated at 170° C. for 30 minutes to cure the electrodeposited coating film, whereby an object to be coated for an abrasion resistance property test was prepared. On the object to be coated for an abrasion resistance property test, each of the aqueous coating compositions obtained in Examples 1 to 88 and Comparative examples 1 to 8 was electrostatically applied by using a rotary atomizing electrostatic coater, so that a dry film thickness is to be 15 μm, whereby an uncured coating film was formed. The uncured coating film was left for 3 minutes, then preheated at 80° C. for 3 minutes, and then heated at 80° C. for 20 minutes, whereby a coated plate for abrasion resistance property test was prepared.

The weight of the above-mentioned obtained coated plate for abrasion resistance property test was measured before the abrasion test, and then was attached to a "5130 ABRASER" (product name, manufactured by TOYO SEIKI co., LTD., Taber type abrasion tester), and each of the coating films was abraded by using a "CS-10 CALIBRASE" (product name, manufactured by Taber Industries., abrasion wheel) under conditions of a load of 500 gf and 500 revolutions. After the abrasion test, the weight of the coated plate for abrasion resistance property test after the abrasion test was measured and the weight change amount (mg) was calculated by using the following formula.

Weight change amount (mg)=weight before the abrasion test—weight after the abrasion test "E" (standing for excellent), and "G" (standing for good) are acceptable. The evaluation results are shown in Table 3.

E (standing for excellent): Weight change amount is less than 20 mg.

G (standing for good): Weight change amount is 20 mg or more and less than 30 mg.

P (standing for poor): Weight change amount is 30 mg or more.

TABLE 3

| | | | Examples | | | | | |
|---|---|---|---|---|---|---|---|---|
| | | | 1 | 2 | 3 | 4 | 5 | 6 |
| Aqueous coating composition No. | | | 1 | 2 | 3 | 4 | 5 | 6 |
| Pigment dispersion (P) | Pigment dispersion (P) No. | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | BARIACE B-35 | | 30 | 30 | 30 | 30 | 30 | 30 |
| | Carbon MA100 | | 0.8 | 0.8 | 0.8 | 0.8 | 0.8 | 0.8 |
| Urethane resin (A) | Urethane resin (A) No. | | A-1 | A-2 | A-3 | A-4 | A-5 | A-6 |
| | Urethane resin (A) blending amount | | 45 | 45 | 45 | 45 | 45 | 45 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 15 | 15 | 15 | 15 | 15 | 15 |
| Phosphoric acid group-containing acrylic resin (R-1) | | | | | | | | |
| Gel fraction (%) | | | 95 | 93 | 94 | 94 | 93 | 92 |
| Evaluations | Storage stability | | E | E | E | G | G | E |
| | Abrasion resistance | | E | E | E | E | G | G |

| | | | Examples | | | | | |
|---|---|---|---|---|---|---|---|---|
| | | | 7 | 8 | 9 | 10 | 11 | 12 |
| Aqueous coating composition No. | | | 7 | 8 | 9 | 10 | 11 | 12 |
| Pigment dispersion (P) | Pigment dispersion (P) No. | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | BARIACE B-35 | | 30 | 30 | 30 | 30 | 30 | 30 |
| | Carbon MA100 | | 0.8 | 0.8 | 0.8 | 0.8 | 0.8 | 0.8 |
| Urethane resin (A) | Urethane resin (A) No. | | A-7 | A-8 | A-9 | A-10 | A-11 | A-12 |
| | Urethane resin (A) blending amount | | 45 | 45 | 45 | 45 | 45 | 45 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 15 | 15 | 15 | 15 | 15 | 15 |
| Phosphoric acid group-containing acrylic resin (R-1) | | | | | | | | |
| Gel fraction (%) | | | 92 | 93 | 93 | 93 | 95 | 91 |
| Evaluations | Storage stability | | E | E | E | G | G | G |
| | Abrasion resistance | | G | G | G | E | E | E |

| | | | Examples | | | | | |
|---|---|---|---|---|---|---|---|---|
| | | | 13 | 14 | 15 | 16 | 17 | 18 |
| Aqueous coating composition No. | | | 13 | 14 | 15 | 16 | 17 | 18 |
| Pigment dispersion (P) | Pigment dispersion (P) No. | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | BARIACE B-35 | | 30 | 30 | 30 | 30 | 30 | 30 |
| | Carbon MA100 | | 0.8 | 0.8 | 0.8 | 0.8 | 0.8 | 0.8 |
| Urethane resin (A) | Urethane resin (A) No. | | A-13 | A-14 | A-15 | A-16 | A-17 | A-18 |
| | Urethane resin (A) blending amount | | 45 | 45 | 45 | 45 | 45 | 45 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 15 | 15 | 15 | 15 | 15 | 15 |
| Phosphoric acid group-containing acrylic resin (R-1) | | | | | | | | |
| Gel fraction (%) | | | 91 | 91 | 90 | 89 | 90 | 88 |
| Evaluations | Storage stability | | E | E | E | E | E | E |
| | Abrasion resistance | | E | E | E | G | G | G |

TABLE 3-continued

| | | | Examples 19 | 20 | 21 | 22 | 23 | 24 |
|---|---|---|---|---|---|---|---|---|
| Aqueous coating composition No. | | | 19 | 20 | 21 | 22 | 23 | 24 |
| Pigment dispersion (P) | Pigment dispersion (P) No. | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | BARIACE B-35 | | 30 | 30 | 30 | 30 | 30 | 30 |
| | Carbon MA100 | | 0.8 | 0.8 | 0.8 | 0.8 | 0.8 | 0.8 |
| Urethane resin (A) | Urethane resin (A) No. | | A-19 | A-20 | A-21 | A-22 | A-23 | A-24 |
| | Urethane resin (A) blending amount | | 45 | 45 | 45 | 45 | 45 | 45 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 15 | 15 | 15 | 15 | 15 | 15 |
| Phosphoric acid group-containing acrylic resin (R-1) | | | | | | | | |
| Gel fraction (%) | | | 89 | 89 | 90 | 92 | 92 | 90 |
| Evaluations | Storage stability | | E | E | E | E | E | E |
| | Abrasion resistance | | E | E | E | E | G | G |

| | | | Examples 25 | 26 | 27 | 28 | 29 | 30 |
|---|---|---|---|---|---|---|---|---|
| Aqueous coating composition No. | | | 25 | 26 | 27 | 28 | 29 | 30 |
| Pigment dispersion (P) | Pigment dispersion (P) No. | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | BARIACE B-35 | | 30 | 30 | 30 | 30 | 30 | 30 |
| | Carbon MA100 | | 0.8 | 0.8 | 0.8 | 0.8 | 0.8 | 0.8 |
| Urethane resin (A) | Urethane resin (A) No. | | A-25 | A-26 | A-27 | A-28 | A-29 | A-30 |
| | Urethane resin (A) blending amount | | 45 | 45 | 45 | 45 | 45 | 45 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 15 | 15 | 15 | 15 | 15 | 15 |
| Phosphoric acid group-containing acrylic resin (R-1) | | | | | | | | |
| Gel fraction (%) | | | 91 | 93 | 89 | 90 | 90 | 92 |
| Evaluations | Storage stability | | E | G | E | G | E | E |
| | Abrasion resistance | | E | G | E | E | G | E |

| | | | Examples 31 | 32 | 33 | 34 | 35 | 36 |
|---|---|---|---|---|---|---|---|---|
| Aqueous coating composition No. | | | 31 | 32 | 33 | 34 | 35 | 36 |
| Pigment dispersion (P) | Pigment dispersion (P) No. | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | BARIACE B-35 | | 30 | 30 | 30 | 30 | 30 | 30 |
| | Carbon MA100 | | 0.8 | 0.8 | 0.8 | 0.8 | 0.8 | 0.8 |
| Urethane resin (A) | Urethane resin (A) No. | | A-31 | A-32 | A-33 | A-34 | A-35 | A-36 |
| | Urethane resin (A) blending amount | | 45 | 45 | 45 | 45 | 45 | 45 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 15 | 15 | 15 | 15 | 15 | 15 |
| Phosphoric acid group-containing acrylic resin (R-1) | | | | | | | | |
| Gel fraction (%) | | | 89 | 88 | 91 | 91 | 92 | 92 |
| Evaluations | Storage stability | | E | E | E | E | G | G |
| | Abrasion resistance | | G | G | E | E | E | G |

TABLE 3-continued

| | | | Examples 37 | 38 | 39 | 40 | 41 | 42 |
|---|---|---|---|---|---|---|---|---|
| Aqueous coating composition No. | | | 37 | 38 | 39 | 40 | 41 | 42 |
| Pigment dispersion (P) | Pigment dispersion (P) No. | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | BARIACE B-35 | | 30 | 30 | 30 | 30 | 30 | 30 |
| | Carbon MA100 | | 0.8 | 0.8 | 0.8 | 0.8 | 0.8 | 0.8 |
| Urethane resin (A) | Urethane resin (A) No. | | A-37 | A-1 | A-1 | A-1 | A-1 | A-1 |
| | Urethane resin (A) blending amount | | 45 | 70 | 10 | 30 | 45 | 45 |
| Curing agent (B) | Polycarbodiimide compound (B1) | Carbodilite SV02 | 10 | 10 | 10 | 10 | | 5 |
| | Melamine compound (B2) | Cymel 325 | 5 | | | 20 | 10 | 7 |
| | Blocked polyisocyanate compound (B4) | Blocked polyisocyanate compound (B4-1) | 5 | | | 15 | 10 | 7 |
| Acrylic resin (C) | Acrylic resin (C-1) | | 15 | | 60 | 5 | 15 | 16 |
| Phosphoric acid group-containing acrylic resin (R-1) | | | | | | | | |
| Gel fraction (%) | | | 89 | 94 | 87 | 95 | 85 | 94 |
| Evaluations | Storage stability | | E | E | E | G | E | E |
| | Abrasion resistance | | G | E | G | E | G | G |

| | | | Examples 43 | 44 | 45 | 46 | 47 | 48 |
|---|---|---|---|---|---|---|---|---|
| Aqueous coating composition No. | | | 43 | 44 | 45 | 46 | 47 | 48 |
| Pigment dispersion (P) | Pigment dispersion (P) No. | | P-1 | P-1 | P-2 | P-2 | P-2 | P-2 |
| | Acrylic resin (C) | Acrylic resin (C-1) | | | 20 | 20 | 20 | 20 |
| | Polyester resin (D) | Polyester resin (D-1) | 20 | 20 | | | | |
| | JR-806 | | 90 | 90 | | | | |
| | BARIACE B-35 | | 30 | 30 | | | | |
| | Carbon MA100 | | 0.8 | 0.8 | 10 | 10 | 10 | 10 |
| Urethane resin (A) | Urethane resin (A) No. | | A-1 | A-1 | A-1 | A-2 | A-3 | A-4 |
| | Urethane resin (A) blending amount | | 45 | 45 | 30 | 30 | 30 | 30 |
| Curing agent (B) | Polycarbodiimide compound (B1) | Carbodilite SV02 | 15 | 20 | 10 | 10 | 10 | 10 |
| | Melamine compound (B2) | Cymel 325 | 3 | | 5 | 5 | 5 | 5 |
| | Blocked polyisocyanate compound (B4) | Blocked polyisocyanate compound (B4-1) | 3 | | 5 | 5 | 5 | 5 |
| Acrylic resin (C) | Acrylic resin (C-1) | | 14 | 15 | 28 | 28 | 28 | 28 |
| Phosphoric acid group-containing acrylic resin (R-1) | | | | | 2 | 2 | 2 | 2 |
| Gel fraction (%) | | | 96 | 89 | 89 | 87 | 88 | 90 |
| Evaluations | Storage stability | | E | E | E | E | E | G |
| | Abrasion resistance | | E | E | E | E | E | E |

| | | | Examples 49 | 50 | 51 | 52 | 53 | 54 |
|---|---|---|---|---|---|---|---|---|
| Aqueous coating composition No. | | | 49 | 50 | 51 | 52 | 53 | 54 |
| Pigment dispersion (P) | Pigment dispersion (P) No. | | P-2 | P-2 | P-2 | P-2 | P-2 | P-2 |
| | Acrylic resin (C) | Acrylic resin (C-1) | 20 | 20 | 20 | 20 | 20 | 20 |
| | Polyester resin (D) | Polyester resin (D-1) | | | | | | |
| | JR-806 | | | | | | | |
| | BARIACE B-35 | | | | | | | |
| | Carbon MA100 | | 10 | 10 | 10 | 10 | 10 | 10 |
| Urethane resin (A) | Urethane resin (A) No. | | A-5 | A-6 | A-7 | A-8 | A-9 | A-10 |
| | Urethane resin (A) blending amount | | 30 | 30 | 30 | 30 | 30 | 30 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 28 | 28 | 28 | 28 | 28 | 28 |
| Phosphoric acid group-containing acrylic resin (R-1) | | | 2 | 2 | 2 | 2 | 2 | 2 |
| Gel fraction (%) | | | 89 | 86 | 85 | 85 | 87 | 89 |
| Evaluations | Storage stability | | G | E | E | E | E | G |
| | Abrasion resistance | | E | E | E | E | G | E |

TABLE 3-continued

| | | | Examples 55 | 56 | 57 | 58 | 59 | 60 |
|---|---|---|---|---|---|---|---|---|
| Aqueous coating composition No. | | | 55 | 56 | 57 | 58 | 59 | 60 |
| Pigment dispersion (P) | Pigment dispersion (P) No. | | P-2 | P-2 | P-2 | P-2 | P-2 | P-2 |
| | Acrylic resin (C) | Acrylic resin (C-1) | 20 | 20 | 20 | 20 | 20 | 20 |
| | Polyester resin (D) | Polyester resin (D-1) | | | | | | |
| | JR-806 | | | | | | | |
| | BARIACE B-35 | | | | | | | |
| | Carbon MA100 | | 10 | 10 | 10 | 10 | 10 | 10 |
| Urethane resin (A) | Urethane resin (A) No. | | A-11 | A-12 | A-13 | A-14 | A-15 | A-16 |
| | Urethane resin (A) blending amount | | 30 | 30 | 30 | 30 | 30 | 30 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 28 | 28 | 28 | 28 | 28 | 28 |
| Phosphoric acid group-containing acrylic resin (R-1) | | | 2 | 2 | 2 | 2 | 2 | 2 |
| Gel fraction (%) | | | 91 | 92 | 92 | 93 | 87 | 86 |
| Evaluations | Storage stability | | G | G | E | G | E | E |
| | Abrasion resistance | | E | E | E | E | E | G |

| | | | Examples 61 | 62 | 63 | 64 | 65 | 66 |
|---|---|---|---|---|---|---|---|---|
| Aqueous coating composition No. | | | 61 | 62 | 63 | 64 | 65 | 66 |
| Pigment dispersion (P) | Pigment dispersion (P) No. | | P-2 | P-2 | P-2 | P-2 | P-2 | P-2 |
| | Acrylic resin (C) | Acrylic resin (C-1) | 20 | 20 | 20 | 20 | 20 | 20 |
| | Polyester resin (D) | Polyester resin (D-1) | | | | | | |
| | JR-806 | | | | | | | |
| | BARIACE B-35 | | | | | | | |
| | Carbon MA100 | | 10 | 10 | 10 | 10 | 10 | 10 |
| Urethane resin (A) | Urethane resin (A) No. | | A-17 | A-18 | A-19 | A-20 | A-21 | A-22 |
| | Urethane resin (A) blending amount | | 30 | 30 | 30 | 30 | 30 | 30 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 28 | 28 | 28 | 28 | 28 | 28 |
| Phosphoric acid group-containing acrylic resin (R-1) | | | 2 | 2 | 2 | 2 | 2 | 2 |
| Gel fraction (%) | | | 87 | 85 | 88 | 89 | 89 | 88 |
| Evaluations | Storage stability | | E | E | E | E | E | E |
| | Abrasion resistance | | G | G | E | E | E | E |

| | | | Examples 67 | 68 | 69 | 70 | 71 | 72 |
|---|---|---|---|---|---|---|---|---|
| Aqueous coating composition No. | | | 67 | 68 | 69 | 70 | 71 | 72 |
| Pigment dispersion (P) | Pigment dispersion (P) No. | | P-2 | P-2 | P-2 | P-2 | P-2 | P-2 |
| | Acrylic resin (C) | Acrylic resin (C-1) | 20 | 20 | 20 | 20 | 20 | 20 |
| | Polyester resin (D) | Polyester resin (D-1) | | | | | | |
| | JR-806 | | | | | | | |
| | BARIACE B-35 | | | | | | | |
| | Carbon MA100 | | 10 | 10 | 10 | 10 | 10 | 10 |
| Urethane resin (A) | Urethane resin (A) No. | | A-23 | A-24 | A-25 | A-26 | A-27 | A-28 |
| | Urethane resin (A) blending amount | | 30 | 30 | 30 | 30 | 30 | 30 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 28 | 28 | 28 | 28 | 28 | 28 |
| Phosphoric acid group-containing acrylic resin (R-1) | | | 2 | 2 | 2 | 2 | 2 | 2 |
| Gel fraction (%) | | | 89 | 87 | 91 | 90 | 86 | 88 |
| Evaluations | Storage stability | | E | E | E | G | E | G |
| | Abrasion resistance | | E | G | E | G | E | E |

TABLE 3-continued

| | | | Examples | | | | | |
|---|---|---|---|---|---|---|---|---|
| | | | 73 | 74 | 75 | 76 | 77 | 78 |
| Aqueous coating composition No. | | | 73 | 74 | 75 | 76 | 77 | 78 |
| Pigment dispersion (P) | Pigment dispersion (P) No. | | P-2 | P-2 | P-2 | P-2 | P-2 | P-2 |
| | Acrylic resin (C) | Acrylic resin (C-1) | 20 | 20 | 20 | 20 | 20 | 20 |
| | Polyester resin (D) | Polyester resin (D-1) | | | | | | |
| | JR-806 | | | | | | | |
| | BARIACE B-35 | | | | | | | |
| | Carbon MA100 | | 10 | 10 | 10 | 10 | 10 | 10 |
| Urethane resin (A) | Urethane resin (A) No. | | A-29 | A-30 | A-31 | A-32 | A-33 | A-34 |
| | Urethane resin (A) blending amount | | 30 | 30 | 30 | 30 | 30 | 30 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 5 |
| | Blocked polyisocyanate compound (B4) | Blocked polyisocyanate compound (B4-1) | 5 | 5 | 5 | 5 | 5 | 5 |
| Acrylic resin (C) | Acrylic resin (C-1) | | 28 | 28 | 28 | 28 | 28 | 28 |
| Phosphoric acid group-containing acrylic resin (R-1) | | | 2 | 2 | 2 | 2 | 2 | 2 |
| Gel fraction (%) | | | 86 | 90 | 85 | 85 | 88 | 87 |
| Evaluations | Storage stability | | E | E | E | E | E | E |
| | Abrasion resistance | | G | E | G | G | E | E |

| | | | Examples | | | | | |
|---|---|---|---|---|---|---|---|---|
| | | | 79 | 80 | 81 | 82 | 83 | 84 |
| Aqueous coating composition No. | | | 79 | 80 | 81 | 82 | 83 | 84 |
| Pigment dispersion (P) | Pigment dispersion (P) No. | | P-2 | P-2 | P-2 | P-2 | P-2 | P-2 |
| | Acrylic resin (C) | Acrylic resin (C-1) | 20 | 20 | 20 | 20 | 20 | 20 |
| | Polyester resin (D) | Polyester resin (D-1) | | | | | | |
| | JR-806 | | | | | | | |
| | BARIACE B-35 | | | | | | | |
| | Carbon MA100 | | 10 | 10 | 10 | 10 | 10 | 10 |
| Urethane resin (A) | Urethane resin (A) No. | | A-35 | A-36 | A-37 | A-1 | A-1 | A-1 |
| | Urethane resin (A) blending amount | | 30 | 30 | 30 | 50 | 5 | 28 |
| Curing agent (B) | Polycarbodiimide compound (B1) | Carbodilite SV02 | 10 | 10 | 10 | 10 | 10 | 10 |
| | Melamine compound (B2) | Cymel 325 | 5 | 5 | 5 | 5 | 5 | 20 |
| | Blocked polyisocyanate compound (B4) | Blocked polyisocyanate compound (B4-1) | 5 | 5 | 5 | 5 | 5 | 15 |
| Acrylic resin (C) | Acrylic resin (C-1) | | 28 | 28 | 28 | 8 | 53 | 5 |
| Phosphoric acid group-containing acrylic resin (R-1) | | | 2 | 2 | 2 | 2 | 2 | 2 |
| Gel fraction (%) | | | 90 | 89 | 87 | 91 | 84 | 92 |
| Evaluations | Storage stability | | G | G | E | E | G | G |
| | Abrasion resistance | | E | E | G | E | G | E |

| | | | Examples | | | | Comparative examples | |
|---|---|---|---|---|---|---|---|---|
| | | | 85 | 86 | 87 | 88 | 1 | 2 |
| Aqueous coating composition No. | | | 85 | 86 | 87 | 88 | 89 | 90 |
| Pigment dispersion (P) | Pigment dispersion (P) No. | | P-2 | P-2 | P-2 | P-2 | P-1 | P-1 |
| | Acrylic resin (C) | Acrylic resin (C-1) | 20 | 20 | 20 | 20 | | |
| | Polyester resin (D) | Polyester resin (D-1) | | | | | 20 | 20 |
| | JR-806 | | | | | | 90 | 90 |
| | BARIACE B-35 | | | | | | 30 | 30 |
| | Carbon MA100 | | 10 | 10 | 10 | 10 | 0.8 | 0.8 |
| Urethane resin (A) | Urethane resin (A) No. | | A-1 | A-1 | A-1 | A-1 | A-38 | A-39 |
| | Urethane resin (A) blending amount | | 30 | 30 | 30 | 30 | 45 | 45 |
| Curing agent (B) | Polycarbodiimide compound (B1) | Carbodilite SV02 | | 2 | 10 | 20 | 10 | 10 |
| | Melamine compound (B2) | Cymel 325 | 10 | 8 | 5 | | 5 | 5 |
| | Blocked polyisocyanate compound (B4) | Blocked polyisocyanate compound (B4-1) | 10 | 8 | 5 | | 5 | 5 |
| Acrylic resin (C) | Acrylic resin (C-1) | | 28 | 30 | 28 | 28 | 15 | 15 |
| Phosphoric acid group-containing acrylic resin (R-1) | | | 2 | 2 | 2 | 2 | | |
| Gel fraction (%) | | | 89 | 86 | 91 | 93 | 75 | 72 |
| Evaluations | Storage stability | | E | E | G | G | G | P |
| | Abrasion resistance | | G | G | E | E | P | P |

TABLE 3-continued

| | | | Comparative examples | | | | | |
|---|---|---|---|---|---|---|---|---|
| | | | 3 | 4 | 5 | 6 | 7 | 8 |
| Aqueous coating composition No. | | | 91 | 92 | 93 | 94 | 95 | 96 |
| Pigment dispersion (P) | Pigment dispersion (P) No. | | P-1 | P-1 | P-2 | P-2 | P-2 | P-2 |
| | Acrylic resin (C) | Acrylic resin (C-1) | | | 20 | 20 | 20 | 20 |
| | Polyester resin (D) | Polyester resin (D-1) | 20 | 20 | | | | |
| | JR-806 | | 90 | 90 | | | | |
| | BARIACE B-35 | | 30 | 30 | | | | |
| | Carbon MA100 | | 0.8 | 0.8 | 10 | 10 | 10 | 10 |
| Urethane resin (A) | Urethane resin (A) No. | | A-1 | A-1 | A-38 | A-39 | A-1 | A-1 |
| | Urethane resin (A) blending amount | | 61 | 23 | 30 | 30 | 46 | 21 |
| Curing agent (B) | Polycarbodiimide compound (B1) | Carbodilite SV02 | 4 | 17 | 10 | 10 | 4 | 17 |
| | Melamine compound (B2) | Cymel 325 | | 20 | 5 | 5 | | 20 |
| | Blocked polyisocyanate compound (B4) | Blocked polyisocyanate compound (B4-1) | | 15 | 5 | 5 | | 15 |
| Acrylic resin (C) | Acrylic resin (C-1) | | 15 | 5 | 28 | 28 | 28 | 5 |
| Phosphoric acid group-containing acrylic resin (R-1) | | | | | 2 | 2 | 2 | 2 |
| Gel fraction (%) | | | 68 | 95 | 73 | 76 | 65 | 92 |
| Evaluations | Storage stability | | E | P | G | P | E | P |
| | Abrasion resistance | | P | E | P | P | P | E |

[Preparation of the Coating Plate for Multilayer Coating Film Test]

Example 89

An uncured electrodeposited coating film was formed by electrodepositing "Elecron GT-10" (product name, manufactured by Kansai Paint Co., Ltd., cationic electrodeposition coating material) on a cold-rolled steel sheet that had been subjected to zinc phosphate conversion treatment to a dry film thickness of 20 μm, and the uncured electrodeposited coating film was heated at 170° C. for 30 minutes to cure the electrodeposited coating film, whereby an object to be coated was prepared.

On the above-mentioned object to be coated, the aqueous coating composition No. 1 obtained in Example 1 was electrostatically applied as the intermediate coating composition by using a rotary atomizing electrostatic coater, so that a dry film thickness is to be 25 μm, whereby a coating film was formed, and the coating film was left for 5 minutes, then preheated at 80° C. for 3 minutes, whereby an uncured intermediate coating film was formed. Next, on the uncured intermediate coating film, the aqueous coating composition No. 45 obtained in Example 45 was electrostatically applied as the basecoat coating composition by using a rotary atomizing electrostatic coater, so that a dry film thickness is to be 15 μm, whereby a coating film was formed, and the coating film was left for 5 minutes, then preheated at 80° C. for 3 minutes, whereby an uncured basecoat coating film was formed. On the above-mentioned uncured basecoat coating film, "KINO 6510" (product name, manufactured by Kansai Paint Co., Ltd., hydroxyl group/isocyanate group curing type acrylic resin/urethane resin based two-component organic solvents type clear-coat coating) was electrostatically applied so that a dry film thickness is to be 35 μm, whereby an uncured clear-coat coating film was formed. The coating film including the uncured clear coating was left for 7 minutes, whereby an uncured multilayer coating film including the intermediate coating film, the basecoat coating film, and the clear-coat coating film was formed. The uncured multilayer coating film was heated at 80° C. for 30 minutes so as to heat the intermediate coating film, the basecoat coating film, and the clear-coat coating film, at once, whereby the coating plate for multilayer coating film test was prepared.

Examples 90 to 136 and Comparative Examples 9 to 12

In the same manner as in Example 89, except that the combination of the aqueous coating compositions in Example 89 was changed to those as shown in Table 4 below, each of the coating plates for multilayer coating film test was prepared.

[Glass Adhesion Property Test]

A urethane adhesive (product name "3740", manufactured by Sunstar Inc., automobile windshield agent) was further applied to the multilayer coating film of each of the coating plates for multilayer coating film test obtained in the above-mentioned Examples 89 to 136 and Comparative examples 9 to 12 so that the applied shape was 20 mm wide, 3 mm thick, and 100 mm long or more, and then a release paper was placed on top thereof and pressed evenly with a flat plate. After removing the flat plate from each of the coating plates for multilayer coating film test, the urethane adhesive on each of the coating plates for multilayer coating film test was left to cure for 72 hours at a temperature of 23±2° C. and a relative humidity of 50±5% with the release paper still placed thereon, whereby an adhesive layer was formed. Then, the release paper was peeled off from each of the coating plates for multilayer coating film test. Next, each of the coating plates for multilayer coating film test was immersed in a thermostatic water bath set at 50° C. for 240 hours, and then immersed in 23° C. water for 1 hour to cool down, after which the following peeling test was performed on each of the coating plates for multilayer coating film test.

The cured adhesive layer was pulled by hand in a direction of 90 degrees or more relative to the multilayer coating film, and cut with a cutter knife at 2-3 mm intervals at an angle of approximately 60 degrees relative to the multilayer coating film until the same reached the coating film surface. The peeling state after peeling off the adhesive layer was evaluated according to the following criteria. "E" (standing for excellent), "G" (standing for good), and "F" (standing for fair) are acceptable. The evaluation results are shown in Table 3.

E (standing for excellent): No peeling of the adhesive layer is observed, and no exposure of the multilayer coating film is observed.

G (standing for good): The multilayer coating film is not destroyed, and only the adhesive layer has peeled off due to cohesive failure, however, the adhesion of the multilayer coating film and the adhesive layer is mostly maintained.

F (standing for fair): The multilayer coating film has peeled off due to cohesive failure, and the width of the peeled off area is less than 1 mm from the area cut by the cutter knife.

P (standing for poor): The multilayer coating film has peeled off due to cohesive failure, and the width of the peeled off area is 1 mm or more from the area cut by the cutter knife.

V (standing for very poor): Peeling is observed at the interface between the multilayer coating film and the adhesive layer.

[Chipping Resistance Property Test]

The coating plates for multilayer coating film test obtained in the above-mentioned Examples 89 to 136 and Comparative examples 9 to 12 were placed on the specimen holder of a stone chipping tester "JA-400 type" (product name, manufactured by Suga Test Instruments Co., Ltd., chipping resistance property test device), and 50 g of crushed stone for roads (δ-5) described in JIS A 5001 was collided with the test plate at an angle of 90 degrees from a distance of 35 cm from the test plate at −20° C. using compressed air of 0.39 MPa (4 kgf/cm$^2$). The test plate was then washed with water, dried, and a cloth adhesive tape (manufactured by NICHIBAN CO., LTD.) was applied to the coating surface, which was then peeled off. The degree of the occurrence of the scratches on the coating film, etc., were visually observed and evaluated according to the following criteria. "E" (standing for excellent), and "G" (standing for good) are acceptable. The evaluation results are shown in Table 4.

E (standing for excellent): The size of the scratches is extremely small and neither the electroplated surface nor the base steel sheet is exposed.

G (standing for good): The size of the scratches is small and neither the electroplated surface nor the base steel sheet is exposed.

P (standing for poor): The size of the scratches is small, however, the electroplated surface or the base steel sheet is exposed.

V (standing for very poor): The size of the scratches is quite large and a large portion of the base steel sheet is also exposed.

TABLE 4

| | | | Examples | | | | | | | | | | |
|---|---|---|---|---|---|---|---|---|---|---|---|---|---|
| | | | 89 | 90 | 91 | 92 | 93 | 94 | 95 | 96 | 97 | 98 | 99 |
| Coating plate for multilayer coating film test | Intermediate coating composition | Aqueous coating composition No. | 1 | 2 | 3 | 4 | 5 | 6 | 7 | 8 | 9 | 10 | 11 |
| | Basecoat coating composition | Aqueous coating composition No. | 45 | 45 | 45 | 45 | 45 | 45 | 45 | 45 | 45 | 45 | 45 |
| Evaluations | Glass adhesion property | | E | E | E | E | E | F | F | F | F | E | E |
| | Chipping resistance property | | E | E | G | G | G | E | E | E | E | E | E |

| | | | Examples | | | | | | | | | | |
|---|---|---|---|---|---|---|---|---|---|---|---|---|---|
| | | | 100 | 101 | 102 | 103 | 104 | 105 | 106 | 107 | 108 | 109 | 110 |
| Coating plate for multilayer coating film test | Intermediate coating composition | Aqueous coating composition No. | 12 | 13 | 14 | 15 | 16 | 17 | 18 | 19 | 20 | 21 | 22 |
| | Basecoat coating composition | Aqueous coating composition No. | 45 | 45 | 45 | 45 | 45 | 45 | 45 | 45 | 45 | 45 | 45 |
| Evaluations | Glass adhesion property | | E | E | E | F | F | F | F | E | E | E | E |
| | Chipping resistance property | | E | E | E | E | E | E | G | G | G | E | E |

| | | | Examples | | | | | | | | | | |
|---|---|---|---|---|---|---|---|---|---|---|---|---|---|
| | | | 111 | 112 | 113 | 114 | 115 | 116 | 117 | 118 | 119 | 120 | 121 |
| Coating plate for multilayer coating film test | Intermediate coating composition | Aqueous coating composition No. | 23 | 24 | 25 | 26 | 27 | 28 | 29 | 30 | 31 | 32 | 33 |
| | Basecoat coating composition | Aqueous coating composition No. | 45 | 45 | 45 | 45 | 45 | 45 | 45 | 45 | 45 | 45 | 45 |
| Evaluations | Glass adhesion property | | E | F | E | F | E | E | E | E | F | F | E |
| | Chipping resistance property | | G | G | G | E | G | G | G | G | G | G | E |

| | | | Examples | | | | | | | | | | |
|---|---|---|---|---|---|---|---|---|---|---|---|---|---|
| | | | 122 | 123 | 124 | 125 | 126 | 127 | 128 | 129 | 130 | 131 | 132 |
| Coating plate for multilayer coating film test | Intermediate coating composition | Aqueous coating composition No. | 34 | 35 | 36 | 37 | 38 | 39 | 40 | 41 | 42 | 43 | 44 |
| | Basecoat coating composition | Aqueous coating composition No. | 45 | 45 | 45 | 45 | 45 | 45 | 45 | 45 | 45 | 45 | 45 |
| Evaluations | Glass adhesion property | | E | E | E | F | E | F | E | F | E | E | F |
| | Chipping resistance property | | E | E | E | E | E | G | G | G | E | E | G |

TABLE 4-continued

| | | | Examples | | Comparative examples | | | |
|---|---|---|---|---|---|---|---|---|
| | | | 133 | 134 | 9 | 10 | 11 | 12 |
| Coating plate for multilayer coating film test | Intermediate coating composition | Aqueous coating composition No. | 1 | 1 | 89 | 90 | 91 | 92 |
| | Basecoat coating composition | Aqueous coating composition No. | 93 | 94 | 93 | 94 | 95 | 96 |
| Evaluations | Glass adhesion property | | F | F | V | V | V | E |
| | Chipping resistance property | | G | G | V | G | V | P |

The invention claimed is:

1. An aqueous coating composition comprising:

a urethane resin (A) particle aqueous dispersion which is obtained from a component containing a secondary amino group- and alkoxysilyl group-containing compound (a1), and an isocyanate group-containing urethane prepolymer (a2); and a curing agent (B), wherein:

the secondary amino group- and alkoxysilyl group-containing compound (a1) is obtained from a component containing a primary amino group- and alkoxysilyl group-containing compound (a11) and a polymerizable unsaturated group-containing compound (a12), and the isocyanate group-containing urethane prepolymer (a2) is obtained from a component containing a polyisocyanate component (a21) and a polyol component (a22), and a content of the curing agent (B) is within a range of 5 to 50 mass % based on a total resin solid amount in the aqueous coating composition.

2. The aqueous coating composition according to claim 1, wherein the polymerizable unsaturated group-containing compound (a12) includes a (meth)acrylate.

3. The aqueous coating composition according to claim 1, wherein the polyisocyanate component (a21) includes an alicyclic polyisocyanate compound (a21-1).

4. The aqueous coating composition according to claim 1, wherein the polyol component (a22) includes a polycarbonate polyol (a22-1) and a polyether polyol (a22-2).

5. The aqueous coating composition according to claim 1, wherein the urethane resin (A) particle aqueous dispersion contains a chain extender (a3) as a component.

6. The aqueous coating composition according to claim 1, wherein the aqueous coating composition contains the urethane resin (A) particle aqueous dispersion by within a range of 10 to 70 mass % based on a total resin solid amount in the aqueous coating composition.

7. The aqueous coating composition according to claim 1, wherein the curing agent (B) includes a polycarbodiimide compound (B1).

8. The aqueous coating composition according to claim 1, further comprising at least one type of a resin selected from an acrylic resin (C) and a polyester resin (D).

9. A coating film forming method comprising steps of:

a step (I-1) of forming an uncured color coating film by applying the aqueous coating composition according to claim 1 on an object to be coated; and a step (I-2) of thermal curing the uncured color coating film which has been formed in the step (I-1).

10. A multilayer coating film forming method comprising steps of:

a step (II-1) of forming an uncured intermediate coating film by applying an intermediate coating composition on an object to be coated;

a step (II-2) of forming an uncured basecoat coating film by applying a basecoat coating composition on the uncured intermediate coating film which has been formed in the step (II-1);

a step (II-3) of forming an uncured clear-coat coating film by applying a clear-coat coating composition on the uncured basecoat coating film which has been formed in the step (II-2); and a step (II-4) of thermal curing the uncured intermediate coating film which has been formed in the step (II-1), the uncured basecoat coating film which has been formed in the step (II-2), and the uncured clear-coat coating film which has been formed in the step (II-3), at once, wherein at least one of the intermediate coating composition and the basecoat coating composition is the aqueous coating composition according to claim 1.

11. A multilayer coating film forming method comprising steps of:

a step (II-1) of forming an uncured intermediate coating film by applying an intermediate coating composition on an object to be coated;

a step (II-2) of forming an uncured basecoat coating film by applying a basecoat coating composition on the uncured intermediate coating film which has been formed in the step (II-1);

a step (II-3) of forming an uncured clear-coat coating film by applying a clear-coat coating composition on the uncured basecoat coating film which has been formed in the step (II-2); and a step (II-4) of thermal curing the uncured intermediate coating film which has been formed in the step (II-1), the uncured basecoat coating film which has been formed in the step (II-2), and the uncured clear-coat coating film which has been formed in the step (II-3), at once, wherein both the intermediate coating composition and the basecoat coating composition is the aqueous coating composition according to claim 1.

* * * * *